United States Patent
Ouki et al.

(10) Patent No.: US 12,211,993 B2
(45) Date of Patent: Jan. 28, 2025

(54) POSITIVE ELECTRODE ACTIVE MATERIAL FOR SECONDARY BATTERY, AND SECONDARY BATTERY

(71) Applicant: MURATA MANUFACTURING CO., LTD., Kyoto (JP)

(72) Inventors: Atsushi Ouki, Tokyo (JP); Susumu Endo, Tokyo (JP); Shinji Hayazaki, Tokyo (JP); Sho Takahashi, Tokyo (JP); Takashige Fujikawa, Tokyo (JP); Masaki Kuratsuka, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 750 days.

(21) Appl. No.: 17/393,502

(22) Filed: Aug. 4, 2021

(65) Prior Publication Data

US 2021/0367230 A1    Nov. 25, 2021

Related U.S. Application Data

(63) Continuation of application No. PCT/JP2020/003095, filed on Jan. 29, 2020.

(30) Foreign Application Priority Data

Feb. 6, 2019   (JP) ................................. 2019-019689

(51) Int. Cl.
*H01M 4/36*     (2006.01)
*H01M 4/505*    (2010.01)
(Continued)

(52) U.S. Cl.
CPC ........... *H01M 4/366* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | | |
|---|---|---|---|
| 2016/0172674 A1* | 6/2016 | Oda | H01M 4/525 429/223 |
| 2019/0270650 A1 | 9/2019 | Imanari et al. | |

(Continued)

FOREIGN PATENT DOCUMENTS

| | | | | |
|---|---|---|---|---|
| JP | 2002124261 A | * | 4/2002 | Y02E 60/10 |
| JP | 2004253174 A | | 9/2004 | |

(Continued)

OTHER PUBLICATIONS

Machine translation of JP 2002124261 A.*

(Continued)

*Primary Examiner* — Jonathan G Leong
*Assistant Examiner* — Tony S Chuo
(74) *Attorney, Agent, or Firm* — K&L Gates LLP

(57) ABSTRACT

A positive electrode active material for a secondary battery includes a center part and a covering part. The center part includes a layered rock-salt lithium-nickel composite oxide. The covering part covers a surface of the center part and includes a boron compound. The positive electrode active material has a crystallite size of a (104) plane that is greater than or equal to 40.0 nm and less than or equal to 74.5 nm. The crystallite size is calculated by X-ray diffractometry and Scherrer equation. The positive electrode active material has a specific surface area that satisfies a condition represented by $-0.0160 \times Z + 1.72 \leq A \leq -0.0324 \times Z + 2.94$ where Z is the crystallite size (nm), and A is the specific surface area ($m^2/g$). The specific surface area is measured by BET specific surface area measurement method.

17 Claims, 6 Drawing Sheets

(51) Int. Cl.
- *H01M 4/525* (2010.01)
- *H01M 10/0525* (2010.01)
- *H01M 4/02* (2006.01)
- *H01M 50/105* (2021.01)

(52) U.S. Cl.
CPC .. *H01M 10/0525* (2013.01); *H01M 2004/021* (2013.01); *H01M 2004/028* (2013.01); *H01M 50/105* (2021.01)

(56) References Cited

U.S. PATENT DOCUMENTS

| | | | |
|---|---|---|---|
| 2019/0386293 A1* | 12/2019 | Chen | H01M 4/505 |
| 2020/0185760 A1* | 6/2020 | Ho | H01M 4/505 |
| 2020/0358094 A1* | 11/2020 | Oshita | H01M 4/0471 |

FOREIGN PATENT DOCUMENTS

| | | | | |
|---|---|---|---|---|
| JP | 2004335278 A | | 11/2004 | |
| JP | 2009076402 A | * | 4/2009 | ............. Y02E 60/10 |
| JP | 2018073686 A | | 5/2018 | |

OTHER PUBLICATIONS

Machine translation of JP 2009076402 A.*
International Search Report for Application No. PCT/JP2020/003095, dated Apr. 7, 2020.

* cited by examiner

POSITIVE ELECTRODE ACTIVE MATERIAL FOR SECONDARY BATTERY, AND SECONDARY BATTERY

CROSS REFERENCE TO RELATED APPLICATIONS

The present application is a continuation of PCT patent application no. PCT/JP2020/003095, filed on Jan. 29, 2020, which claims priority to Japanese patent application no. JP2019-019689, filed on Feb. 6, 2019, the entire contents of which are being incorporated herein by reference.

BACKGROUND

The present technology relates to: a positive electrode active material, for a secondary battery, including a layered rock-salt lithium-nickel composite oxide; and a secondary battery using the positive electrode active material for a secondary battery.

Various electronic apparatuses such as mobile phones have been widely used. Such widespread use has promoted development of a secondary battery as a power source that is smaller in size and lighter in weight and allows for a higher energy density. The secondary battery includes a positive electrode, a negative electrode, and an electrolytic solution. The positive electrode includes a positive electrode active material.

A configuration of the positive electrode active material influences battery characteristics of the secondary battery. Accordingly, various considerations have been given to the configuration of the positive electrode active material. For example, in order to improve thermal stability, a lithium composite oxide ($Li_xNi_yCo_2X_{(1-y-z)}O_w$) in a form of particles having lithium borate on its surface is used. For example, see Japanese Unexamined Patent Application Publication No. 2004-335278. In order to improve a characteristic such as a cyclability characteristic, for example, a lithium composite oxide ($Li_xNi_{1-y}M_yO_{2+\alpha}$) in a form of particles having an alkali content of its particle surface that is set to be within a predetermined range is used. For example, see International Publication No. 2012/133436. In order to improve an output characteristic, for example, a lithium composite oxide ($Li_x(Ni_{1-y}Co_y)_{1-z}M_zO_2$) that has a peak intensity ratio set to be within a predetermined range is used. For example, see Japanese Unexamined Patent Application Publication No. 2004-327246. The peak intensity ratio is calculated on the basis of a result of an analysis conducted by X-ray photoelectron spectroscopy.

SUMMARY

The present technology relates to a positive electrode active material and a secondary battery including a positive electrode active material.

Electronic apparatuses, on which a secondary battery is to be mounted, are increasingly gaining higher performance and more functions. This is causing more frequent use of such electronic apparatuses and expanding a use environment of the electronic apparatuses. Accordingly, there is a need for improvement in terms of battery characteristics of the secondary battery.

The present technology has addressed such an issue and provides a positive electrode active material for a secondary battery, and a secondary battery that are able to achieve a desirable and enhanced battery characteristic.

A positive electrode active material for a secondary battery according to an embodiment of the present technology includes a center part and a covering part. The center part includes a layered rock-salt lithium-nickel composite oxide represented by Formula (1) below. The covering part covers a surface of the center part and includes a boron compound. The positive electrode active material has a crystallite size of a (104) plane that is greater than or equal to 40.0 nanometers and less than or equal to 74.5 nanometers. The crystallite size is calculated by X-ray diffractometry and Scherrer equation. The positive electrode active material has a specific surface area that satisfies a condition represented by Expression (2) below. The specific surface area is measured by Brunauer-Emmett-Teller specific surface area measurement method. The positive electrode active material has a first element concentration ratio that is greater than or equal to 0.08 and less than or equal to 0.80. The first element concentration ratio is calculated on the basis of a C1s spectrum and an O1s spectrum measured by X-ray photoelectron spectroscopy and is represented by Expression (3) below. The positive electrode active material has a second element concentration ratio that is greater than or equal to 0.60 and less than or equal to 1.50. The second element concentration ratio is calculated on the basis of a Li1s spectrum, a $Ni2p_{3/2}$ spectrum, a $Co2p_{3/2}$ spectrum, a $Mn2p_{1/2}$ spectrum, and an Al2s spectrum measured by the X-ray photoelectron spectroscopy and is represented by Expression (4) below. The positive electrode active material has a third element concentration ratio that is greater than or equal to 0.15 and less than or equal to 0.90. The third element concentration ratio is calculated on the basis of a B1s spectrum, a $Ni2p_{3/2}$ spectrum, a $Co2p_{3/2}$ spectrum, a $Mn2p_{1/2}$ spectrum, and an Al2s spectrum measured by the X-ray photoelectron spectroscopy and is represented by Expression (5) below.

$$Li_aNi_{1-b}M_bO_c \qquad (1)$$

where:
M is at least one of cobalt (Co), iron (Fe), manganese (Mn), copper (Cu), zinc (Zn), aluminum (Al), chromium (Cr), vanadium (V), titanium (Ti), magnesium (Mg), or zirconium (Zr); and
a, b, and c satisfy $0.8 < a < 1.2$, $0 \le b \le 0.4$, and $0 < c < 3$.

$$-0.0160 \times Z + 1.72 \le A \le -0.0324 \times Z + 2.94 \qquad (2)$$

where:
Z is the crystallite size of the (104) plane in nanometers; and
A is the specific surface area in square meters per gram.

$$R1 = I1/I2 \qquad (3)$$

where:
R1 is the first element concentration ratio;
I1 is a $CO_3$ concentration in atomic percent calculated on the basis of the C1s spectrum;
I2 is a Me—O concentration in atomic percent calculated on the basis of the O1s spectrum; and
Me—O is an oxide deriving from O that is bonded to Li, Ni, or M in Formula (1) and has a spectrum detected within a range of binding energy that is higher than or equal to 528 electron volts and lower than or equal to 531 electron volts.

$$R2 = I3/I4 \qquad (4)$$

where:
R2 is the second element concentration ratio;
I3 is a Li concentration in atomic percent calculated on the basis of the Li1s spectrum; and
I4 is sum total of a Ni concentration in atomic percent, a Co concentration in atomic percent, a Mn concentration in atomic percent, and an Al concentration in atomic percent that are calculated on the basis of the $Ni2p_{3/2}$ spectrum, the $Co2p_{3/2}$ spectrum, the $Mn2p_{1/2}$ spectrum, and the Al2s spectrum, respectively.

$$R3=I5/I4 \quad (5)$$

where:
R3 is the third element concentration ratio;
I4 is sum total of a Ni concentration in atomic percent, a Co concentration in atomic percent, a Mn concentration in atomic percent, and an Al concentration in atomic percent that are calculated on the basis of the $Ni2p_{3/2}$ spectrum, the $Co2p_{3/2}$ spectrum, the $Mn2p_{1/2}$ spectrum, and the Al2s spectrum, respectively; and
I5 is a B concentration in atomic percent calculated on the basis of the B1s spectrum.

A secondary battery according to an embodiment of the present technology includes a positive electrode, a negative electrode, and an electrolytic solution. The positive electrode includes a positive electrode active material. The positive electrode active material has a configuration similar to that of the above-described positive electrode active material for a secondary battery of the embodiment of the present technology.

According to the positive electrode active material for a secondary battery, or the secondary battery of the embodiment of the present technology, the positive electrode active material has the configuration and the physical properties described above, and thus contributes to desirable and enhanced battery characteristics.

It should be understood that effects of the present technology are not necessarily limited to those described above and may include any of a series of effects described below in relation to the present technology.

DETAILED DESCRIPTION

As described herein, the present disclosure will be described based on examples with reference to the drawings. The present disclosure is not to be considered limited to the examples, where various numerical values, materials and other description in the examples are considered illustrative of the present technology and by way of example.

1. Secondary Battery

A description is given first of a secondary battery according to an embodiment of the present technology. A positive electrode active material for a secondary battery according to an embodiment of the technology is a portion or a component of the secondary battery described here, and is therefore described together below. Hereinafter, the positive electrode active material for a second battery according to the embodiment of the present technology is referred to as a "positive electrode active material".

The secondary battery according to an embodiment is a lithium-ion secondary battery that obtains a battery capacity by utilizing a lithium or lithium-ion insertion phenomenon and a lithium or lithium-ion extraction phenomenon, as will be described later.

1-1. Configuration

In the following, a description is given first of an overall configuration of the secondary battery, and then of a configuration and physical properties of the positive electrode active material according to an embodiment.

1-1-1. Overall Configuration

Figure 1:
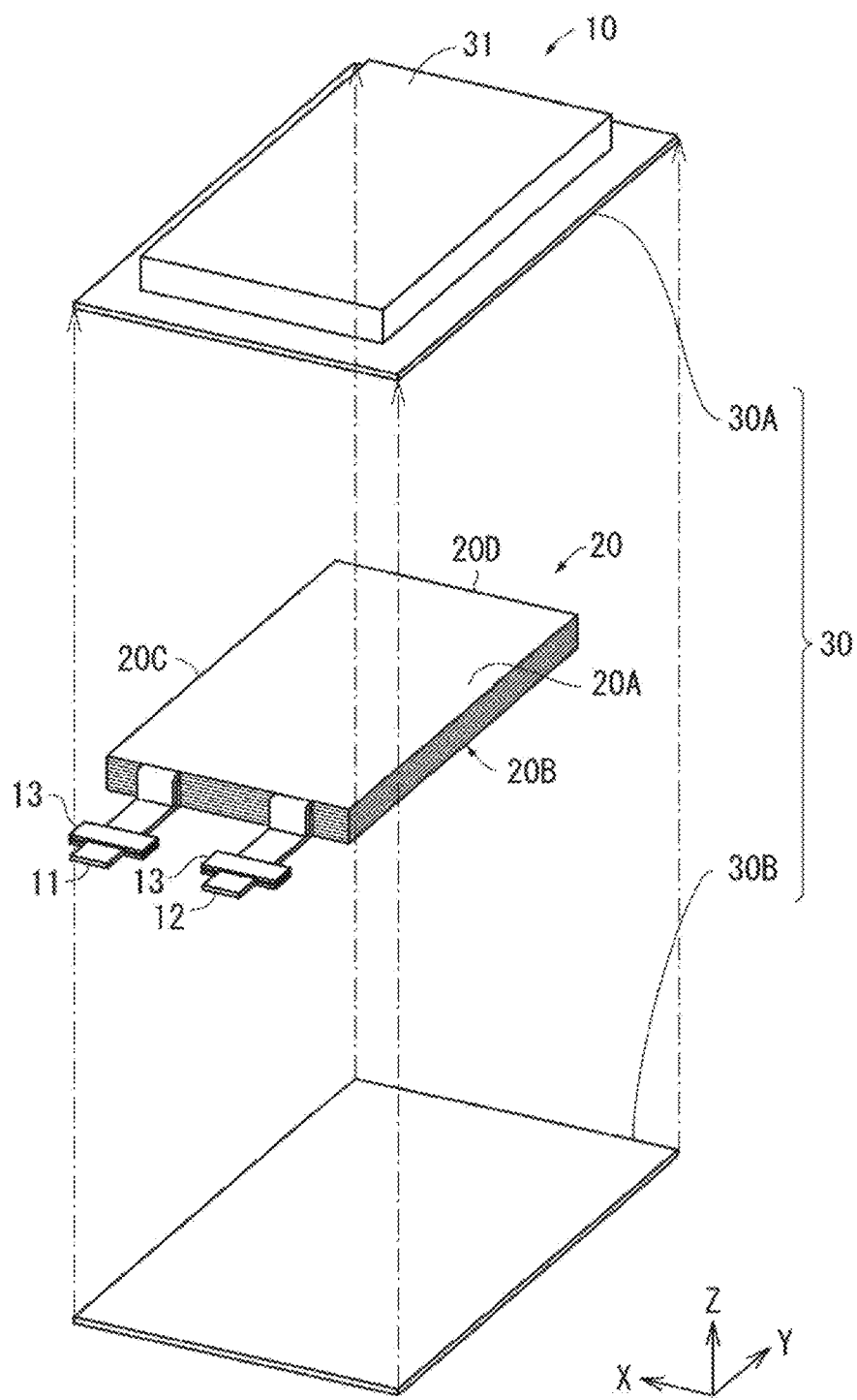
FIG. 1 is an exploded perspective view of a configuration of a secondary battery according to embodiment of the technology.
Figure 2:
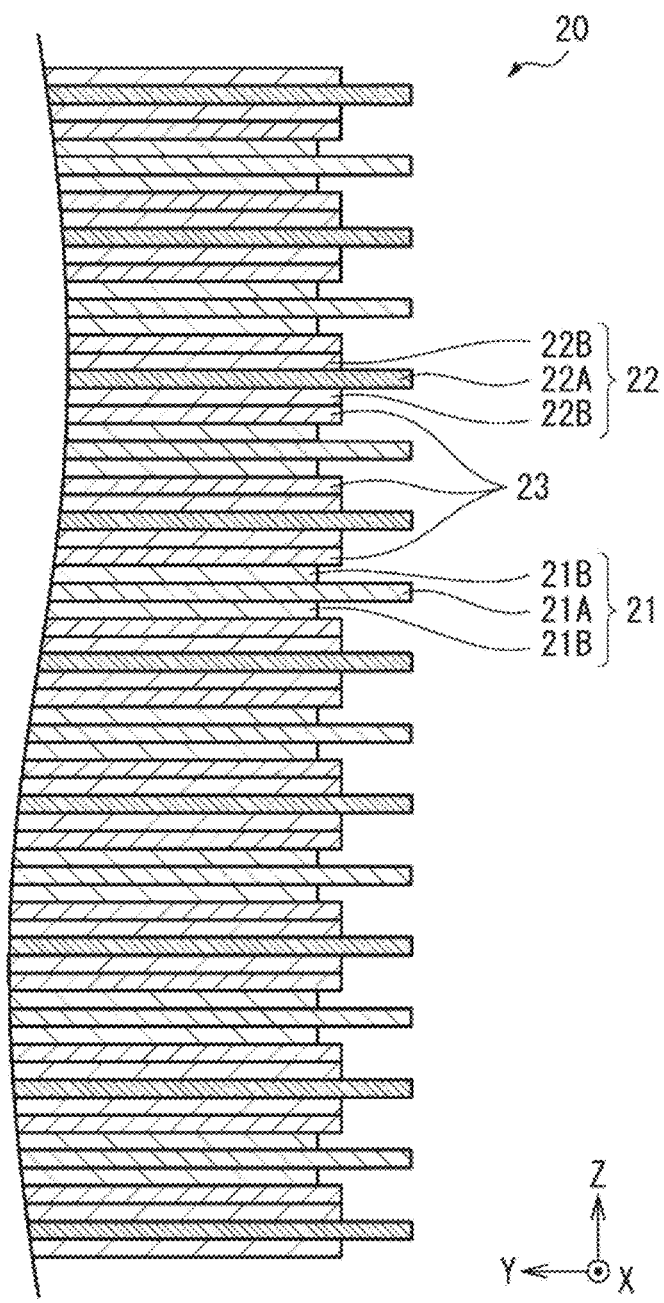
FIG. 2 is a sectional view of a configuration of an electrode body illustrated in FIG. 1.
Figure 3:
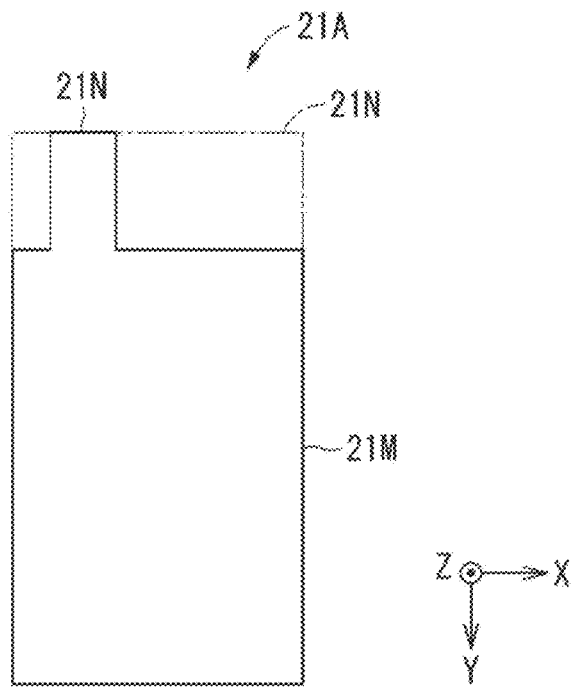
FIG. 3 is a plan view of a configuration of a positive electrode current collector illustrated in FIG. 2.
Figure 4:
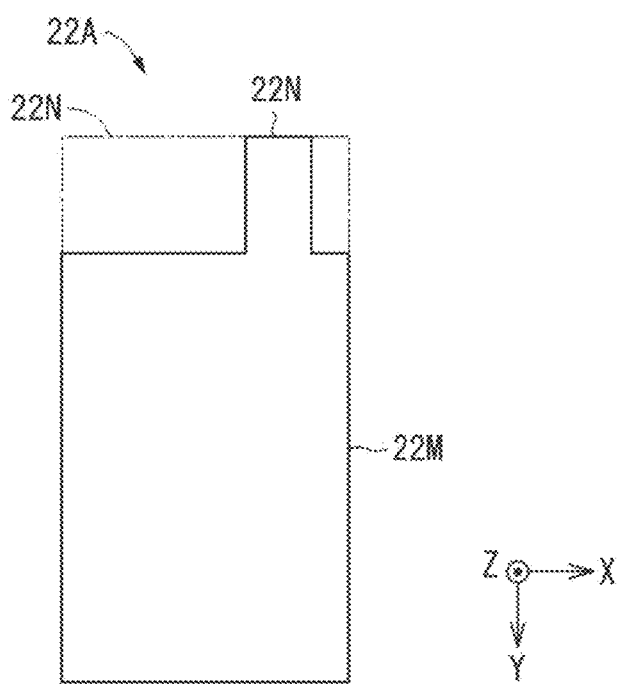
FIG. 4 is a plan view of a configuration of a negative electrode current collector illustrated in FIG. 2.

FIG. 1 is an exploded perspective view of a configuration of a secondary battery 10 that is the secondary battery according to an embodiment of the present technology. FIG. 2 illustrates a sectional configuration of an electrode body 20 illustrated in FIG. 1. FIG. 3 illustrates a plan configuration of a positive electrode current collector 21A illustrated in FIG. 2. FIG. 4 illustrates a plan configuration of a negative electrode current collector 22A illustrated in FIG. 2.

FIG. 1 illustrates a state in which the electrode body 20 and an outer package member 30 are separated away from each other. The outer package member 30 includes a first member 30A and a second member 30B. FIG. 2 illustrates a state before two or more positive electrode current collectors 21A (two or more positive-electrode-current-collector exposed parts 21N illustrated in FIG. 3) are joined to each other and before the negative electrode current collectors 22A (two or more negative-electrode-current-collector exposed parts 22N illustrated in FIG. 4) are joined to each other.

As illustrated in FIG. 1, for example, the secondary battery 10 includes the electrode body 20 of a laminated type serving as a battery device and the outer package member 30 having a film shape. That is, the secondary battery 10 described here is, for example, a non-aqueous electrolyte secondary battery of a laminated-film type in which the electrode body 20 having a rectangular shape is contained in the outer package member 30. Such a secondary battery 10 allows for reduction in size, weight, and thickness.

A positive electrode lead 11 is attached to the electrode body 20, and a negative electrode lead 12 is also attached to the electrode body 20. The electrode body 20 may include a major surface 20A and a major surface 20B. The major surface 20B is provided on the opposite side to the major surface 20A. The major surface 20A includes longer sides 20C and shorter sides 20D.

The positive electrode lead 11 and the negative electrode lead 12 are led out from inside to outside of the outer package member 30 in the same direction. The positive electrode lead 11 and the negative electrode lead 12 each have a thin plate shape or a meshed shape, for example. The positive electrode lead 11 and the negative electrode lead 12 each include, for example, a metal material such as aluminum, copper, nickel, or stainless steel.

A sealing film 13 is provided between the outer package member 30 and the positive electrode lead 11. Another sealing film 13 is provided between the outer package member 30 and the negative electrode lead 12 in a similar manner. The sealing films 13 are each adapted to prevent entry of outside air. The sealing films 13 each include a material having adherence to corresponding one of the positive electrode lead 11 and the negative electrode lead 12. Examples of such a material include a polyolefin resin such as polyethylene, polypropylene, modified polyethylene, or modified polypropylene.

Outer Package Member

The outer package member 30 has softness or flexibility, for example. The outer package member 30 contains the electrode body 20 including, without limitation, a positive electrode 21, a negative electrode 22, and an electrolytic solution. The outer package member 30 includes, for example, two films that are separated from each other, i.e., the first member 30A and the second member 30B. The first member 30A and the second member 30B are stacked on each other with the electrode body 20 interposed therebetween. Four sides of the first member 30A are each adhered to corresponding one of the four sides of the second member 30B, providing a sealing portion at the periphery of each of the first member 30A and the second member 30B. The first member 30A includes a housing part 31 adapted to contain the electrode body 20. The housing part 31 is formed, for example, by a deep drawing process.

The outer package member 30 is, for example, a laminated film including a thermal-fusion-bonding resin layer, a metal layer, and a surface protective layer that are stacked in this order from an inner side, i.e., a side closer to the electrode body 20. The thermal-fusion-bonding resin layer includes, for example, a polymer material such as polypropylene or polyethylene. The metal layer includes, for example, a metal material such as aluminum. The surface protective layer includes, for example, a polymer material such as nylon. Specifically, the outer package member 30 is, for example, an aluminum laminated film including a polyethylene film, an aluminum foil, and a nylon film that are adhered in this order from the inner side. The outer edges (the thermal-fusion-bonding resin layer) of the first member 30A and the outer edges (the thermal-fusion-bonding resin layer) of the second member 30B are, for example, adhered to each other by a fusion bonding process or with use of an adhesive.

Instead of the aluminum laminated film described above, the outer package member 30 may be: a laminated film having any other lamination structure; a polymer film such as a propylene film; or a metal film according to an embodiment. The outer package member 30 may also be a laminated film including an aluminum foil, and a polymer film stacked on one side or each of both sides of the aluminum foil.

Electrode Body

As illustrated in FIGS. 1 and 2, the electrode body 20 includes, for example, the positive electrode 21, the negative electrode 22, a separator 23, and the electrolytic solution. The electrolytic solution is a liquid electrolyte. In the electrode body 20, two or more positive electrodes 21 and two or more negative electrodes 22 are alternately stacked on each other with the separators 23 being interposed therebetween. The positive electrodes 21, the negative electrodes 22, and the separators 23 are each impregnated with the electrolytic solution.

Regarding the secondary battery 10, in order to prevent precipitation of lithium metal on a surface of each of the negative electrodes 22 in the middle of charging, it is preferable that an electrochemical equivalent per unit area of the negative electrode 22 be greater than an electrochemical equivalent per unit area of the positive electrode 21.

Positive Electrode

As illustrated in FIG. 2, the positive electrodes 21 each include, for example, the positive electrode current collector 21A, and a positive electrode active material layer 21B provided on each of both sides of the positive electrode current collector 21A according to an embodiment. However, the positive electrode active material layer 21B may be provided on only one side of the positive electrode current collector 21A.

As illustrated in FIG. 3, the positive electrode current collector 21A includes a positive-electrode-active-material-layer formation part 21M and the positive-electrode-current-collector exposed part 21N according to an embodiment. The positive-electrode-active-material-layer formation part 21M is a part on which the positive electrode active material layer 21B is provided, and has a rectangular shape. The positive-electrode-current-collector exposed part 21N is a part on which no positive electrode active material layer 21B is provided, and has a rectangular shape. For example, the positive electrode active material layer 21B is provided on each of both sides of the positive-electrode-active-material-layer formation part 21M, as described above. The positive-electrode-current-collector exposed part 21N is a part extending from a portion of the positive-electrode-active-material-layer formation part 21M. The positive-electrode-current-collector exposed part 21N has a width smaller than the width of the positive-electrode-active-material-layer formation part 21M. The width refers to a dimension in an X-axis direction. However, as illustrated by a dash-dot-dot-dash line in FIG. 3, the positive-electrode-current-collector exposed part 21N may have the same width as the positive-electrode-active-material-layer formation part 21M. Two or more positive-electrode-current-collector exposed parts 21N are joined to each other, and the positive electrode lead 11 is joined to the joined positive-electrode-current-collector exposed parts 21N.

The positive electrode current collector 21A is a metal foil such as an aluminum foil, a nickel foil, or a stainless-steel foil, for example. The positive electrode active material layer 21B includes a positive electrode active material into which lithium is insertable and from which lithium is extractable. Lithium is an electrode reactant. The positive electrode active material is in a form of particles. The positive electrode active material layer 21B may further include one or more of additives including, without limitation, a binder and a conductor on an as-needed basis.

The positive electrode active material includes one or more of positive electrode materials into which lithium is insertable and from which lithium is extractable. The positive electrode material includes a lithium-containing compound. The term "lithium-containing compound" is a generic term for a compound that includes lithium (Li) as a constituent element.

Specifically, the lithium-containing compound is a layered rock-salt lithium-nickel composite oxide represented by Formula (1) below. That is, the lithium-nickel composite oxide has a layered rock-salt crystal structure. A reason for this is that such a crystal structure helps to stably achieve a high battery capacity even with a low battery voltage. The composition of lithium differs depending on a charge and discharge state. Therefore, the value of "a" representing the composition of lithium is of a fully discharged state.

$$Li_aNi_{1-b}M_bO_c \qquad (1)$$

where:
M is at least one of cobalt (Co), iron (Fe), manganese (Mn), copper (Cu), zinc (Zn), aluminum (Al), chromium (Cr), vanadium (V), titanium (Ti), magnesium (Mg), or zirconium (Zr); and
a, b, and c satisfy $0.8<a<1.2$, $0 \le b \le 0.4$, and $0<c<3$.

As can be appreciated from Formula (1), the lithium-nickel composite oxide is a composite oxide that also includes nickel (Ni) as a constituent element together with lithium. The lithium-nickel composite oxide may further include one or more of additional metal elements (M) on an as-needed basis.

Specifically, the lithium-nickel composite oxide includes, for example, one or more of respective compounds represented by Formula (1-1), Formula (1-2), and Formula (1-3).

$$Li_aNi_{1-b-c-d}Co_bAl_cM1_dO_e \qquad (1-1)$$

where:
M1 is at least one of iron (Fe), copper (Cu), zinc (Zn), chromium (Cr), vanadium (V), titanium (Ti), magnesium (Mg), or zirconium (Zr); and
a, b, c, d, and e satisfy $0.8<a<1.2$, $0 \le b \le 0.4$, $0 \le c \le 0.4$, $0 \le d \le 0.1$, $0<e<3$, and $0 \le (b+c+d) \le 0.3$.

$$Li_aNi_{1-b-c-d}Co_bMn_cM2_dO_e \qquad (1-2)$$

where:
M2 is at least one of iron (Fe), copper (Cu), zinc (Zn), chromium (Cr), vanadium (V), titanium (Ti), magnesium (Mg), or zirconium (Zr); and
a, b, c, d, and e satisfy $0.8<a<1.2$, $0 \le b \le 0.4$, $0 \le c \le 0.4$, $0 \le d \le 0.1$, $0<e<3$, and $0.1 \le (b+c+d) \le 0.7$.

$$Li_aNi_{1-b-c-d-e}Co_bMn_cAl_dM3_eO_f \qquad (1-3)$$

where:
M3 is at least one of iron (Fe), copper (Cu), zinc (Zn), chromium (Cr), vanadium (V), titanium (Ti), magnesium (Mg), or zirconium (Zr); and
a, b, c, d, e, and f satisfy $0.8<a<1.2$, $0 \le b \le 0.2$, $0<c \le 0.1$, $0<d \le 0.1$, $0 \le e \le 0.1$, $0<f<3$, and $0<(b+c+d+e) \le 0.3$.

The compound represented by Formula (1-1) is a nickel-cobalt-aluminum-based lithium-nickel composite oxide. The compound represented by Formula (1-2) is a nickel-cobalt-manganese-based lithium-nickel composite oxide. The compound represented by Formula (1-3) is a nickel-cobalt-manganese-aluminum-based lithium-nickel composite oxide. If there is a compound that can be represented by both Formula (1-1) and Formula (1-2), such a compound is regarded as the compound represented by Formula (1-1).

More specifically, examples of the compound represented by Formula (1-1) include $LiNiO_2$, $LiNi_{0.9}Co_{0.1}O_2$, $LiNi_{0.ss}Co_{0.1}Al_{0.05}O_2$, $LiNi_{0.90}Co_{0.05}Al_{0.05}O_2$, $LiNi_{0.82}Co_{0.14}Al_{0.04}O_2$, $LiNi_{0.78}Co_{0.18}Al_{0.04}O_2$, and $LiNi_{0.90}Co_{0.06}Al_{0.04}O_2$. Examples of the compound represented by Formula (1-2) include $LiNi_{0.5}Co_{0.2}Mn_{0.3}O_2$, $LiNi_{0.5}Co_{0.1}Mn_{0.1}O_2$, $LiNi_{0.9}Co_{0.05}Mn_{0.05}O_2$, $LiNi_{0.3}Co_{0.3}Mn_{0.3}O_2$, and $LiNi_{0.84}Co_{0.05}Mn_{0.08}O_2$. Examples of the compound represented by Formula (1-3) include $LiNi_{0.50}Co_{0.10}Mn_{0.05}Al_{0.05}O_2$.

In particular, the lithium-nickel composite oxide has a surface that is covered with a boron compound. That is, the positive electrode active material (the positive electrode material) includes the lithium-nickel composite oxide and the boron compound covering the surface of the lithium-nickel composite oxide. The term "boron compound" is a generic term for a compound that includes boron (B) as a constituent element. A reason why the surface of the lithium-nickel composite oxide is covered with the boron compound is that it allows the surface of the lithium-nickel composite oxide to be electrochemically stable, therefore suppressing a decomposition reaction of the electrolytic solution on the surface of the lithium-nickel composite oxide. The boron compound is not limited to a particular kind, and examples thereof include boric acid ($H_3BO_3$), lithium tetraborate ($Li_2B_4O_7$), ammonium pentaborate ($NH_4B_5O_8$), lithium metaborate ($LiBO_2$), and boron oxide ($B_2O_3$).

The positive electrode active material that includes the lithium-nickel composite oxide having a surface covered with the boron compound as the positive electrode material has a predetermined configuration and predetermined physical properties in order to improve battery characteristics of the secondary battery 10. Such a configuration and such physical properties of the positive electrode active material will be described later in detail.

The positive electrode active material may further include one or more of other positive electrode materials, i.e., other lithium-containing compounds. The other lithium-containing compounds may be other lithium-containing compounds having the layered rock-salt crystal structure, lithium-containing compounds having a spinel crystal structure, or lithium-containing compounds having an olivine crystal structure. Examples of the other lithium-containing compounds having the layered rock-salt crystal structure include a lithium composite oxide such as $LiCoO_2$. Examples of the lithium-containing compounds having the spinel crystal structure include a lithium composite oxide such as $LiMn_2O_4$. Examples of the lithium-containing compounds having the olivine crystal structure include a lithium phosphate compound such as $LiFePO_4$, $LiMnPO_4$, or $LiMn_{0.5}Fe_{0.5}PO_4$.

The positive electrode active material may further include one or more of compounds that do not include lithium as a constituent element, i.e., non-lithium-containing compounds. Examples of the non-lithium-containing compounds include an inorganic compound such as $MnO_2$, $V_2O_5$, $V_6O_{13}$, NiS, or MoS.

The binder includes, for example, one or more of polymer materials including, without limitation, polyvinylidene difluoride, polytetrafluoroethylene, polyacrylonitrile, styrene-butadiene rubber, and carboxymethyl cellulose. The binder may be a copolymer of two or more of the polymer materials, for example.

The conductor includes, for example, one or more of carbon materials including, without limitation, graphite, carbon black, and Ketjen black. The conductor may be, for example, a metal material or an electrically conductive polymer material as long as the material is electrically conductive.

Negative Electrode

As illustrated in FIG. 2, the negative electrodes 22 each include, for example, a negative electrode current collector 22A, and a negative electrode active material layer 22B provided on each of both sides of the negative electrode current collector 22A. However, the negative electrode active material layer 22B may be provided on only one side of the negative electrode current collector 22A.

As illustrated in FIG. 4, the negative electrode current collector 22A includes a negative-electrode-active-material-layer formation part 22M and a negative-electrode-current-collector exposed part 22N according to an embodiment. The negative-electrode-active-material-layer formation part 22M is a part on which the negative electrode active material layer 22B is provided, and has a rectangular shape. The negative-electrode-current-collector exposed part 22N is a part on which no negative electrode active material layer 22B is provided, and has a rectangular shape. For example, the negative electrode active material layer 22B is provided on each of both sides of the negative-electrode-active-material-layer formation part 22M, as described above. The negative-electrode-current-collector exposed part 22N is a part extending from a portion of the negative-electrode-active-material-layer formation part 22M. The negative-electrode-current-collector exposed part 22N has a width smaller than the width of the negative-electrode-active-material-layer formation part 22M. The width refers to a dimension in the X-axis direction. The negative-electrode-current-collector exposed part 22N is positioned not to overlap with the positive-electrode-current-collector exposed part 21N. As illustrated by a dash-dot-dot-dash line in FIG. 4, the negative-electrode-current-collector exposed part 22N may have the same width as the negative-electrode-active-material-layer formation part 22M. Two or more negative-electrode-current-collector exposed parts 22N are joined to each other, and the negative electrode lead 12 is joined to the joined negative-electrode-current-collector exposed parts 22N.

The negative electrode current collector 22A is a metal foil such as a copper foil, a nickel foil, or a stainless-steel foil, for example. The negative electrode active material layer 22B includes, for example, a negative electrode active material into which lithium is insertable and from which lithium is extractable. Lithium is an electrode reactant. The negative electrode active material layer 22B may include one or more of additives including, without limitation, a binder and a conductor on an as-needed basis. Details of the binder and the conductor are as described above.

The negative electrode active material includes one or more of negative electrode materials into which lithium is insertable and from which lithium is extractable. Examples of the negative electrode material include a carbon material, a metal-based material or combinations thereof, i.e., a mixture of the carbon material and the metal-based material.

Examples of the carbon material include one or more of non-graphitizable carbon, graphitizable carbon, graphite, pyrolytic carbons, cokes, glassy carbons, an organic polymer compound fired body, carbon fibers, and activated carbon.

The metal-based material includes one or more elements among metal elements and metalloid elements as a constituent element or constituent elements. The metal-based material may be an alloy, a compound, or a mixture. The metal-based material may be crystalline or amorphous. Examples of the metal elements and the metalloid elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). The alloy may include two or more metal elements, may include one or more metal elements and one or more metalloid elements, or may include one or more non-metallic elements. The metal-based material has a state such as a solid solution, a eutectic (a eutectic mixture), an intermetallic compound, or a state including a structure in which two or more thereof coexist. Examples of the compound include an oxide.

The negative electrode material may be, for example, a material such as a metal oxide or a polymer material. Examples of the metal oxide include a lithium composite oxide, an iron oxide, a ruthenium oxide, and a molybdenum oxide. Examples of the lithium composite oxide include a lithium-titanium composite oxide such as lithium titanate ($Li_4TisO_2$). Examples of the polymer material include polyacetylene, polyaniline, and polypyrrole.

Separator

The separators 23 are each interposed between the positive electrode 21 and the negative electrode 22. The separators 23 allow lithium ions to pass therethrough while preventing generation of a short circuit due to contact between the positive electrodes 21 and the negative electrodes 22. The separators 23 are each, for example, a porous film including one or more materials among polymer materials and ceramic materials. The separators 23 may each be a stacked body including two or more porous films. Examples of the polymer materials include polyethylene, polypropylene, and polytetrafluoroethylene. A mixture of two or more of such polymer materials or a copolymer of two or more of such polymer materials may be used.

Electrolytic Solution

The electrolytic solution includes a solvent and an electrolyte salt. The electrolytic solution may further include one or more of additives.

The solvent is a non-aqueous solvent according to an embodiment. An electrolytic solution including the non-aqueous solvent is a so-called non-aqueous electrolytic solution. Only one solvent (non-aqueous solvent) may be used, or alternatively, two or more solvents (non-aqueous solvents) may be used according to an embodiment.

Specifically, examples of the non-aqueous solvent include a cyclic carbonate ester, a chain carbonate ester, a lactone, a chain carboxylate ester, a nitrile (mononitrile) compound, an unsaturated cyclic carbonate ester, a halogenated carbonate ester, a sulfonate ester, an acid anhydride, a dicyano compound (a dinitrile compound), a diisocyanate compound, a phosphate ester, and suitable combinations thereof. A reason why such a non-aqueous solvent may be used is that desirable and enhanced characteristics including, without limitation, a capacity characteristic, a cyclability characteristic, and a storage characteristic are thereby obtainable.

Examples of the cyclic carbonate ester include ethylene carbonate, propylene carbonate, and butylene carbonate. Examples of the chain carbonate ester include dimethyl carbonate, diethyl carbonate, and ethyl methyl carbonate. Examples of the lactone include γ-butyrolactone and γ-valerolactone. Examples of the chain carboxylate ester include methyl acetate, ethyl acetate, methyl propionate, ethyl propionate, and propyl propionate. Examples of the nitrile compound include acetonitrile, methoxy acetonitrile, 3-methoxy propionitrile, succinonitrile, and adiponitrile. Examples of the unsaturated cyclic carbonate ester include vinylene carbonate, vinyl ethylene carbonate, and methylene ethylene carbonate. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, and phthalonitrile. Examples of the diisocyanate compound include hexamethylene diisocyanate. Examples of the phosphate ester include trimethyl phosphate and triethyl phosphate.

In addition, examples of the non-aqueous solvent may include N,N-dimethylformamide, N-methylpyrrolidinone, N-methyloxazolicinone, nitromethane, nitroethane, sulfolane, dimethyl sulfoxide, and ethylene sulfide.

The electrolyte salt is, for example, a light metal salt such as a lithium salt. Only one electrolyte salt (lithium salt) may be used, or alternatively, two or more electrolyte salts (lithium salts) may be used. A content of the electrolyte salt is, for example, from 0.3 mol/kg to 3.0 mol/kg both inclusive with respect to the solvent, but is not particularly limited thereto.

Specifically, examples of the lithium salt include lithium hexafluorophosphate, lithium tetrafluoroborate, lithium hexafluoroarsenate, lithium perchlorate, lithium trifluoromethanesulfonate, lithium bis(fluorosulfonyl)imide, lithium bis(trifluoromethane sulfonyl)imide, lithium bis (pentafluoroethane sulfonyl)imide, lithium tris(trifluoromethane sulfonyl)methyl, lithium chloride, lithium bromide, lithium fluorophosphate, lithium difluorophosphate, and lithium bis(oxalato)borate.

1-1-2. Configuration and Physical Properties of Positive Electrode Active Material FIG. 5 schematically illustrates a plan configuration of a positive electrode active material 100 that is the positive electrode active material of an embodiment of the present technology.

Figure 5:
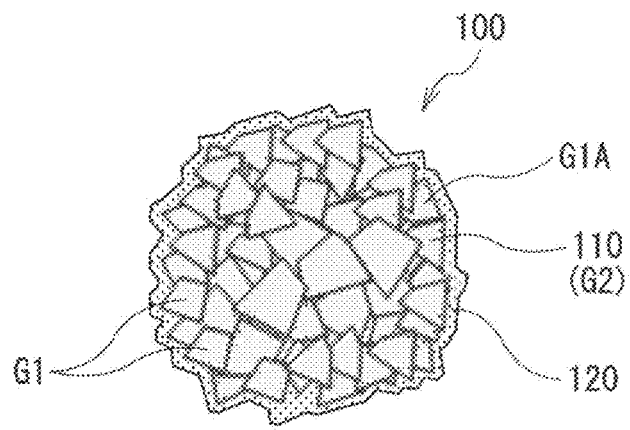
FIG. 5 is a schematic plan view of a configuration of a positive electrode active material according to an embodiment of the technology.

As illustrated in FIG. 5, the positive electrode active material 100 includes a center part 110 and a covering part 120 covering a surface of the center part 110. The center part 110 is in a form of particles. The center part 110 includes the lithium-nickel composite oxide described above. The covering part 120 includes the boron compound described above. Note that the covering part 120 may cover the entire surface of the center part 110 as illustrated in FIG. 5; however, the covering part 120 may cover only a portion of the surface of the center part 110.

The positive electrode active material 100 includes, for example, primary particles G1 that each include the lithium-nickel composite oxide and are aggregated with each other to form a secondary particle G2 (the center part 110). Accordingly, the boron compound (the covering part 120) covers, for example, a surface of the secondary particle G2. A portion of the boron compound is considered to be mixed in the primary particles G1 in a solid solution state.

Necessary Requirement

The positive electrode active material 100, i.e., the center part 110 (the lithium-nickel composite oxide) having the surface covered with the covering part 120 (the boron compound), has a predetermined configuration and predetermined physical properties in order to improve the battery characteristics of the secondary battery 10 as described above. In the following, descriptions are given of necessary requirements of the positive electrode active material 100, and then of optional requirements of the positive electrode active material 100 according to an embodiment of the present technology.

The following five conditions (first to fifth conditions) related to the configuration and the physical properties of the positive electrode active material 100 are provided according to an embodiment.

First Condition

The positive electrode active material 100 has a crystallite size Z (nm) of a (104) plane that is greater than or equal to 40.0 nm and less than or equal to 74.5 nm. The crystallite size Z (nm) is calculated by X-ray diffractometry (XRD) and Scherrer equation.

Second Condition

The positive electrode active material 100 has a specific surface area A (m$^2$/g) that satisfies a condition represented by Expression (2) below. The specific surface area A (m$^2$/g) is measured by BET specific surface area measurement method. The value of "−0.0160×Z" used to calculate a lower limit value shall be rounded off to the second decimal place, and the value of "−0.0324−Z" used to calculate an upper limit value shall be rounded off to the second decimal place. Hereinafter, a range of the specific surface area A represented by Expression (2), i.e., a range of the specific surface area A defined in relation to the crystallite size Z, is referred to as an "appropriate range". A theory of deriving the appropriate range of the above-described specific surface area A will be described later.

$$-0.0160\times Z+1.72 \leq A \leq -0.0324\times Z+2.94 \qquad (2)$$

where:
  Z is the crystallite size (nm) of the (104) plane of the positive electrode active material 100; and
  A is the specific surface area (m$^2$/g) of the positive electrode active material 100.

Figure 6:
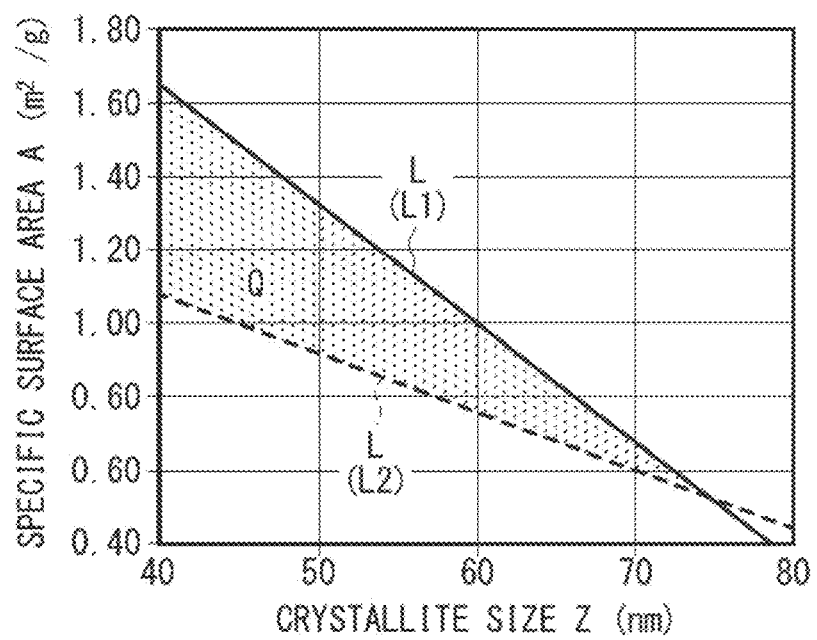
FIG. 6 is a diagram illustrating an appropriate range of a specific surface area (a crystallite size) of the positive electrode active material.

FIG. 6 illustrates the appropriate range of the specific surface area A (the crystallite size Z) of the positive electrode active material 100. In FIG. 6, a horizontal axis represents the crystallite size Z (nm), and a vertical axis represents the specific surface area A (m$^2$/g).

As illustrated in FIG. 6, the range of allowable values of the crystallite size Z and the specific surface area A based on the first condition and the second condition described above is a range Q defined by two straight lines L, i.e., a solid line L1 and a broken line L2. In FIG. 6, the range Q is shaded. The solid line L1 is a straight line represented by y=−0.0324x+2.94, and the broken line L2 is a straight line represented by y=−0.0160x+1.72, where y is the specific surface area A and x is the crystallite size Z.

Third Condition

The positive electrode active material 100 has an element concentration ratio calculated on the basis of a carbon (C) is spectrum and an oxygen (O) is spectrum measured by X-ray photoelectron spectroscopy (XPS), i.e., an element concentration ratio R1 (a first element concentration ratio) represented by Expression (3) below, that is greater than or equal to 0.08 and less than or equal to 0.80. The element concentration ratio R1 is considered as a parameter mainly representing a distribution state of a residual lithium component ($Li_2CO_3$) on the surface of the positive electrode active material 100.

$$R1=I1/I2 \qquad (3)$$

where:
  R1 is the element concentration ratio;
  I1 is a $CO_3$ concentration (at %) calculated on the basis of the C1s spectrum;
  I2 is a Me—O concentration (at %) calculated on the basis of the O1s spectrum; and Me-O is an oxide deriving from O that is bonded to Li, Ni, or M in Formula (1) and has a spectrum detected within a range of binding energy that is higher than or equal to 528 eV and lower than or equal to 531 eV.

Fourth Condition

The positive electrode active material 100 has another element concentration ratio calculated on the basis of a lithium (Li) is spectrum, a nickel (Ni) $2p_{3/2}$ spectrum, a cobalt (Co) $2p_{3/2}$ spectrum, a manganese (Mn) $2p_{1/2}$ spectrum, and an aluminum (Al) 2s spectrum measured by XPS, i.e., an element concentration ratio R2 (a second element concentration ratio) represented by Expression (4) below, that is greater than or equal to 0.60 and less than or equal to 1.50. The element concentration ratio R2 is considered as a parameter mainly representing a distribution state of lithium on the surface of the positive electrode active material 100.

$$R2=I3/I4 \qquad (4)$$

where:
R2 is the element concentration ratio;
I3 is a Li concentration (at %) calculated on the basis of the Li1s spectrum; and
I4 is the sum total of a Ni concentration (at %), a Co concentration (at %), a Mn concentration (at %), and an Al concentration (at %) calculated on the basis of the $Ni2p_{3/2}$ spectrum, the $Co2p_{3/2}$ spectrum, the $Mn2p_{1/2}$ spectrum, and the Al2s spectrum, respectively.

Fifth Condition

The positive electrode active material 100 has still another element concentration ratio calculated on the basis of a boron (B) is spectrum, a $Ni2p_{3/2}$ spectrum, a $Co2p_{3/2}$ spectrum, a $Mn2p_{1/2}$ spectrum, and an Al2s spectrum measured by XPS, i.e., an element concentration ratio R3 (a third element concentration ratio) represented by Expression (5) below, that is greater than or equal to 0.15 and less than or equal to 0.90. The element concentration ratio R3 is considered as a parameter representing a distribution state of boron on the surface of the positive electrode active material 100.

$$R3=I5/I4 \qquad (5)$$

where:
R3 is the element concentration ratio;
I4 is the sum total of a Ni concentration (at %), a Co concentration (at %), a Mn concentration (at %), and an Al concentration (at %) calculated on the basis of the $Ni2p_{3/2}$ spectrum, the $Co2p_{3/2}$ spectrum, the $Mn2p_{1/2}$ spectrum, and the Al2s spectrum, respectively; and
I5 is a B concentration (at %) calculated on the basis of the B1s spectrum.

A reason why the first condition and the second condition are provided regarding the positive electrode active material 100 including the center part 110 (the lithium-nickel composite oxide) and the covering part 120 (the boron compound) is that the specific surface area A is thereby made appropriate in relation to the crystallite size Z. Making the specific surface area A appropriate in relation to the crystallite size Z suppresses a decomposition reaction of the electrolytic solution on the surface of the reactive positive electrode active material 100, and also suppresses generation of unnecessary gas caused by the decomposition reaction of the electrolytic solution. Accordingly, it can be considered that discharge capacity is prevented from decreasing easily and generation of gas is suppressed, even if charging and discharging are repeatedly performed.

Further, a reason why the third, the fourth, and the fifth conditions are also provided in a case where the first and the second conditions are satisfied is that a surface state (a distribution state of each of lithium, boron, and the residual lithium component) of the positive electrode active material 100 is thereby made appropriate. That is, the surface of the center part 110 is covered appropriately with the covering part 120 while the remaining amount of the residual lithium component is appropriately reduced on the surface of the positive electrode active material 100. Accordingly, entering and exiting of the lithium ions are facilitated at the center part 110 and the decomposition reaction of the electrolytic solution is suppressed on the surface of the center part 110 while generation of gas caused by the remaining of the residual lithium component is suppressed. In this case, it can be considered that the decomposition reaction of the electrolytic solution is suppressed effectively even if the secondary battery 10 (the positive electrode active material 100) is used (charged and discharged) or stored in a high temperature environment.

The residual lithium component is an unnecessary component that remains in the positive electrode active material 100 in the process of manufacturing the positive electrode active material 100. Examples of such a residual lithium component include lithium carbonate ($Li_2CO_3$) and lithium hydroxide (LiOH). The residual lithium component can cause generation of unnecessary gas upon charging and discharging the secondary battery 10.

Measurement Method and Measurement Conditions

Details of a method and conditions of measuring a series of parameters related to the above-described five conditions (the first to the fifth conditions) are as follows.

The crystallite size Z is a parameter calculated on the basis of a result of an analysis of the positive electrode active material 100 by the XRD. As described above, the crystallite size Z is calculated by the Scherrer equation represented by Expression (6) below.

$$Z=K\lambda/B \cos \theta \qquad (6)$$

where:
K is a Scherrer constant;
λ is a wavelength (nm) of X-rays;
B is a full width at half maximum (°) depending on the crystallite size; and
θ is the Bragg angle, i.e. the value (°) of half the diffraction angle 2θ.

In a case of analyzing the positive electrode active material 100 by the XRD, for example, a fully automated multipurpose X-ray diffractometer SmartLab manufactured by Rigaku Corporation is used. In this case, the conditions are as follows.
Goniometer: SmartLab,
attachment: standard χ cradle,
monochromator: Bent,
scanning mode: 2θ/θ,
scanning type: FT,
X-ray: CuKα ray,
irradiation intensity: 45 kV/200 mA,
incident slit: ½ deg,
light receiving slit 1: ½ deg,
light receiving slit 2: 0.300 mm,
start: 15,
stop: 90, and
step: 0.02.

In accordance therewith, in the Scherrer equation represented by Expression (6), K is set to 0.89, λ (the wavelength of the CuKα ray) is set to 0.15418 nm, and B is set to the full width at half maximum.

The specific surface area A ($m^2$/g) is the surface area per unit mass of the positive electrode active material 100, and is measured by the BET specific surface area measurement method, as described above. The BET specific surface area measurement method is a gas adsorption method in which nitrogen molecules ($N_2$) are adsorbed on the positive electrode active material 100 in the form of particles, and the specific surface area of the positive electrode active material 100 is measured on the basis of an amount of the adsorbed nitrogen molecules. In a case of measuring the specific surface area A, for example, a fully automated specific surface area measurement apparatus Macsorb (registered trademark) manufactured by Mountech Co., Ltd. is used. In this case, the mass of the positive electrode active material 100 is set to 5 g, and a deaeration condition is set as 250° C.×40 minutes.

In a case of analyzing the positive electrode active material 100 by the XPS, for example, an X-ray photoelectron spectrometer Quantera SXM manufactured by ULVAC-PHI, Inc. is used. The result of the analysis conducted by the XPS (regarding a C1s spectrum, an O1s spectrum, a Li1s spectrum, a Ni2p$_{3/2}$ spectrum, a Co2p$_{3/2}$ spectrum, a Mn2p$_{1/2}$ spectrum, an Al2s spectrum, and a B1s spectrum) includes intensities of a series of peaks measured automatically and a $CO_3$ concentration, a Me-O concentration, a Li concentration, a B concentration, a Ni concentration, a Co concentration, a Mn concentration, and an Al concentration calculated thereafter (by conversion) on the basis of the result of the measurement of the intensities of the series of peaks. The element concentration ratios R1 to R3 are calculated thereby.

The remaining amount of the residual lithium component is measured, for example, by the Warder method. In the following, a description is given of an example case of checking the remaining amount of each of lithium carbonate ($Li_2CO_3$) and lithium hydroxide (LiOH).

In a case of checking the remaining amount, first, a predetermined amount (S g) of the positive electrode active material 100 is weighed, following which the weighed positive electrode active material 100 is put into a sample bottle. Here, for example, S is set to 10 (g). Thereafter, ultrapure water (50 ml=50 cm$^3$) is put into the sample bottle together with a stirrer, following which the ultrapure water is stirred with use of a stirring apparatus (stirring time=1 hour). Thereafter, the stirred ultrapure water is let stand (standing time=1 hour) to collect a supernatant liquid of the ultrapure water with use of a syringe with a filter, and the collected supernatant liquid is filtered. Thereafter, the filtered supernatant liquid (10 ml) is collected with use of a hole pipette, and the collected supernatant liquid is put into a glass-stoppered conical flask.

Thereafter, one drop of phenolphthalein solution is added to the supernatant liquid, following which the supernatant liquid is titrated with use of a titration solution (hydrochloric acid (HCl) having a concentration M) while stirring the supernatant liquid with use of a stirring apparatus, until the liquid color (red) disappears. The amount (A ml) of the added hydrochloric acid is read. Here, for example, the concentration M is set to 0.02 mol/l (=0.02 mol/dm$^3$). Thereafter, two drops of bromophenol blue solution are added to the supernatant liquid, following which the supernatant liquid is titrated with use of the above-described titration solution while stirring the supernatant liquid with use of a stirring apparatus, until the liquid color turns from blue to yellowish green (until the color of blue disappears). The amount (B ml) of the added hydrochloric acid is read. As a titration apparatus, for example, an automatic titration apparatus COM-1600 manufactured by HIRANUMA Co., Ltd. is used.

Lastly, a remaining rate (%) of lithium carbonate is calculated by Expression (7) below, and a remaining rate (%) of lithium hydroxide is calculated by Expression (8) below.

$$\text{Remaining rate (\%) of lithium carbonate} = [(M \times 2B \times (f/1000) \times 0.5 \times 73.892 \times 5)/S] \times 100 \quad (7)$$

where:
S is a weight (g) of the positive electrode active material 100;
A is an amount (ml) of a titration solution added up to an endpoint of first titration using a phenolphthalein solution;
B is an amount (ml) of the titration solution added from the endpoint of the first titration using the phenolphthalein solution up to an endpoint of second titration using a bromophenol blue solution;
f is a factor depending on the concentration of the titration solution; and
M is a concentration (mol/l) of the titration solution.

$$\text{Remaining rate (\%) of lithium hydroxide} = [(M \times (A-B) \times (f/1000) \times 23.941 \times 5)/S] \times 100 \quad (8)$$

where:
S is a weight (g) of the positive electrode active material 100;
A is an amount (ml) of a titration solution added up to an endpoint of first titration using a phenolphthalein solution:
B is an amount (ml) of the titration solution added from the endpoint of the first titration using the phenolphthalein solution up to an endpoint of second titration using a bromophenol blue solution;
f is a factor depending on the concentration of the titration solution; and
M is a concentration (mol/l) of the titration solution.

Figure 7:
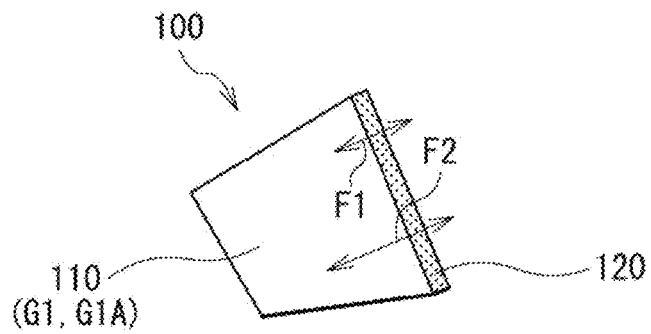
FIG. 7 is a plan view for describing an analysis range of X-ray photoelectron spectroscopy and a measurement range of the Warder method.

FIG. 7 illustrates a plan configuration corresponding to the illustration in FIG. 5 to describe an analysis range of the XPS and a measurement range of the Warder method. FIG. 7 illustrates only a portion of the positive electrode active material 100 illustrated in FIG. 5, i.e., a portion of the center part 110 (a single primary particle G1 (G1A)) and a portion of the covering part 120 in an enlarged manner.

As illustrated in FIG. 7, a range in which the residual lithium component can be analyzed by the XPS is limited to the vicinity of the surface of the positive electrode active material 100, i.e., a relatively narrow range F1. In contrast, a range in which the residual lithium component can be measured by the Warder method is from the surface to the inner part of the positive electrode active material 100, i.e., a relatively wide range F2.

Optional Requirements

In addition to the above, a series of conditions described below related to the positive electrode active material 100 may be further provided according to an embodiment.

Specifically, it is preferable that the specific surface area A be greater than or equal to 0.53 m$^2$/g and less than or equal to 1.25 m$^2$/g. A reason for this is that a decomposition reaction of the electrolytic solution is sufficiently suppressed, and generation of gas is also sufficiently suppressed.

Further, the particle size in the volume-based particle size distribution is not particularly limited. It is preferable in particular that the particle size D50 be greater than or equal to 11.8 μm and less than or equal to 14.4 μm. In this case, it is preferable that the particle size D10 be greater than or equal to 2.8 μm and less than or equal to 4.0 μm, and the particle size D90 be greater than or equal to 22.7 μm and less than or equal to 26.3 μm. A reason for these is that generation of a short circuit is suppressed and separation of the positive electrode active material layer 21B is suppressed while the energy density per unit weight is secured. The above-described particle sizes can be measured with use of, for example, a laser-diffraction particle size distribution measurement apparatus SALD-2100 manufactured by Shimadzu Corporation.

In more detail, if the particle sizes are too small, the positive electrode active material layer 21B separates easily from the positive electrode current collector 21A when the positive electrode active material layer 21B is compression-molded upon manufacturing of the positive electrode 21. Further, the amount of the added agents including, without limitation, the conductor and the binder is to be increased due to increase in the surface area of the positive electrode active material 100. This leads to easier decrease in energy density per unit weight. In contrast, if the particle sizes are too large, the positive electrode active material 100 easily passes through the separator 23. This leads to easier generation of a short circuit at the positive electrode 21 and the negative electrode 22.

In a case where the above-described conditions related to the particle sizes in the volume-based particle size distribution are satisfied, it is preferable that a compressed density be greater than or equal to 3.40 g/cm$^3$ and less than or equal to 3.60 g/cm$^3$. A reason for this is that generation of gas is suppressed while a high energy density is secured.

In more detail, if the compressed density is lower than 3.40 g/cm$^3$, it is more difficult for the positive electrode 21 (the positive electrode active material layer 21B) to be packed with the positive electrode active material 100. This leads to easier decrease in energy density per unit weight. In contrast, if the compressed density is higher than 3.60 g/cm$^3$, the positive electrode active material 100 cracks more easily. This leads to easier generation of gas due to formation of a reactive fresh surface.

The above-described compressed density (g/cm$^3$) is a so-called press density (volume density), and is measured, for example, by the following procedure. First, the positive electrode active material 100 and cellulose are put into a mortar, following which the positive electrode active material 100 and the cellulose are mixed uniformly with use of the mortar to obtain a mixed sample. In this case, a mixture ratio (a weight ratio) between the positive electrode active material 100 and the cellulose is set to 98:2. Thereafter, 1 g of the mixed sample is weighed, following which the mixed sample is pressed at constant pressure (pressing pressure=60 MPa), with use of a pressing jig to form the mixed sample into a pellet shape having a predetermined area (cm$^2$). Thereafter, the thickness (cm) of the mixed sample is measured. In this case, thicknesses are measured at five different points, following which an average value of the thicknesses at the five points is calculated. Thereafter, the weight (g) of the mixed sample is measured. Lastly, the compressed density is calculated on the basis of results of the measurement of the thickness and the weight by the expression: compressed density=weight/(area×thickness).

Further, it is preferable that the positive electrode active material 100 having two or more average particle sizes be used to allow the volume-based particle size distribution of the positive electrode active material 100 to have two or more peaks. A reason for this is that it is easier for the positive electrode 21 (the positive electrode active material layer 21B) to be packed with the positive electrode active material 100, as compared with a case where the volume-based particle size distribution has only one peak. Another reason is that the number of contact points between the particles of the positive electrode active material 100 increases to make it easier for force at the time of compression molding to be dispersed upon fabrication of the positive electrode 21 (upon compression molding of the positive electrode active material layer 21B), thereby preventing the positive electrode active material 100 from cracking easily. Accordingly, the energy density per unit weight increases. In addition, the decomposition reaction of the electrolytic solution due to formation of the reactive fresh surface is suppressed. Therefore, generation of gas due to the decomposition reaction of the electrolytic solution is also suppressed. The volume-based particle size distribution can be measured, for example, with use of the laser-diffraction particle size distribution measurement apparatus described above.

Figure 8:
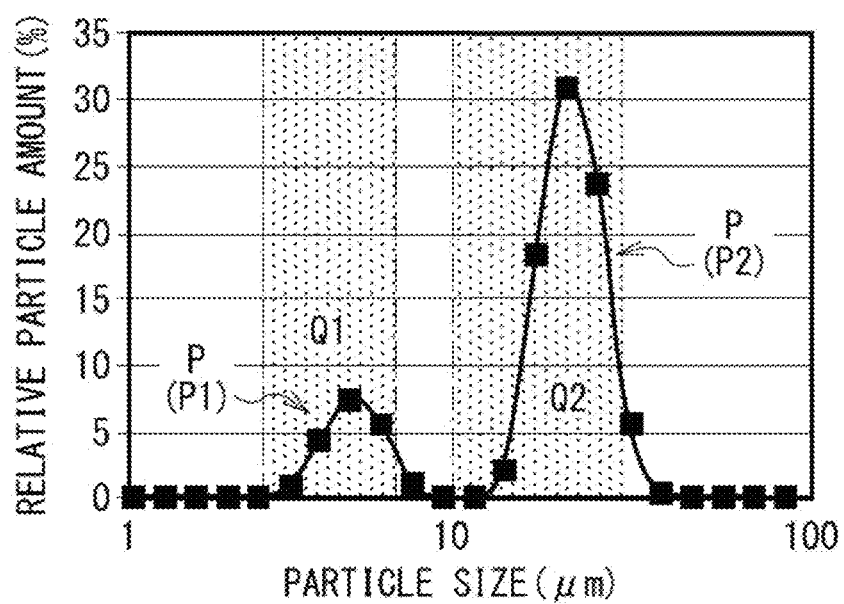
FIG. 8 is a diagram illustrating an example of a volume-based particle size distribution of the positive electrode active material.

FIG. 8 illustrates an example of a volume-based particle size distribution. In FIG. 8, a horizontal axis represents a particle size (μm), and a vertical axis represents a relative particle amount (%). In particular, as illustrated in FIG. 8, in a case where the volume-based particle size distribution has two peaks P (P1 and P2) (two-particle mixed system), it is preferable that the volume-based particle size distribution have a first peak P1 within a range Q1 of the particle size that is from 3 μm to 7 μm both inclusive, and have a second peak P2 within a range Q2 of the particle size that is from 14 μm to 30 μm both inclusive. A reason for this is that this makes it easier for the positive electrode active material 100 to form a close-packed structure in the positive electrode 21 (the positive electrode active material layer 21B) in a case where the particle sizes (D10, D50, and D90) in the volume-based particle size distribution satisfy the above-described conditions. In FIG. 8, each of the ranges Q1 and Q2 is shaded.

In a case where the conditions related to the particle sizes of the two peaks P (P1 and P2) in the volume-based particle size distribution described above are satisfied, it is preferable that the compressed density be higher than or equal to 3.45 g/cm$^3$ and lower than or equal to 3.70 g/cm$^3$. A reason for this is that generation of gas is suppressed while a high energy density is secured for a reason similar to that in the case where the above-described conditions related to the particle sizes in the volume-based particle size distribution are satisfied.

1-2. Operation

For example, upon charging the secondary battery 10, lithium ions are extracted from the positive electrode 21 (the positive electrode active material layer 21B) and the extracted lithium ions are inserted into the negative electrode 22 (the negative electrode active material layer 22B) via the electrolytic solution. Further, for example, upon discharging the secondary battery 10, lithium ions are extracted from the negative electrode 22, and the extracted lithium ions are inserted into the positive electrode 21 via the electrolytic solution.

An open-circuit voltage (i.e., a battery voltage) in a fully charged state per pair of electrodes (the positive electrode 21 and the negative electrode 22) is not particularly limited, and may be lower than 4.20 V or may be 4.20 V or higher. In particular, the battery voltage is preferably 4.25 V or higher, and is more preferably from 4.25 V to 6.00 V both inclusive. A reason for this is that the amount of extracted lithium per unit mass is thereby increased as compared with a case where the battery voltage is 4.20 V, even if the same kind of positive electrode active material is used. In this case, in order to obtain a high energy density, the amount of the positive electrode active material and the amount of the negative electrode active material are adjusted in relation to each other in accordance with the amount of extracted lithium per unit mass described above.

1-3. Manufacturing Method

In the following, a method of manufacturing the positive electrode active material 100 is described with reference to FIG. 5, and then a method of manufacturing the secondary battery 10 using the positive electrode active material 100 is described with reference to FIGS. 1 to 4.

1-3-1. Method of Manufacturing Positive Electrode Active Material

In a case of manufacturing the positive electrode active material 100, for example, a precursor-body fabrication process, a first firing process, a water washing process, and a covering process (a second firing process) are performed in this order as described below according to an embodiment.

Precursor-Body Fabrication Process

First, as raw materials, a lithium source (a lithium compound), a nickel source (a nickel compound), and on an as-needed basis, a source of an additional metal element (M in Formula (1)) (an additional compound) are prepared. An example case of using the additional compound (an additional metal element) will be described below. The lithium compound may be, for example, an inorganic compound or an organic compound. Only one lithium compound may be used, or two or more lithium compounds may be used. The above description related to the lithium compound is similarly applicable to the nickel compound and the additional compound.

Specific examples of the lithium compound are as follows. Examples of the lithium compound as an inorganic compound include lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogen sulfide, lithium sulfate, lithium hydrogen sulfate, lithium nitride, lithium azide, lithium nitrite, lithium phosphate, lithium dihydrogen phosphate, and lithium bicarbonate. Examples of the lithium compound as an organic compound include methyllithium, vinyllithium, isopropyllithium, butyllithium, phenyllithium, lithium oxalate, and lithium acetate.

Thereafter, the nickel compound and the additional compound are dissolved with use of an aqueous solvent such as pure water, following which a coprecipitate (a nickel composite coprecipitated hydroxide) is obtained by a coprecipitation method. In this case, a mixture ratio between the nickel compound and the additional compound is adjusted in accordance with the composition of the center part 110 (the lithium-nickel composite oxide) to be finally obtained. As an alkali compound for coprecipitation, for example, one or more of hydroxides including, without limitation, sodium hydroxide (NaOH) and ammonium hydroxide (NH$_4$OH) are used. Thereafter, the nickel composite coprecipitated hydroxide is washed with water, following which the washed nickel composite coprecipitated hydroxide is dried.

In a case of using the positive electrode active material 100 including two kinds of particles having different particle sizes as described above (the positive electrode active material 100 of a bi-model design including large-sized particles and small-sized particles), a reaction time in coprecipitation is adjusted upon obtaining the nickel composite coprecipitated hydroxide by the coprecipitation method, to adjust the particle size of the secondary particle G2 of the nickel composite coprecipitated hydroxide. Thus, a nickel composite coprecipitated hydroxide (the large-sized particles) having a desired relatively large average particle size and a nickel composite coprecipitated hydroxide (the small-sized particles) having a desired relatively small average particle size are obtained.

Lastly, the lithium compound, the nickel composite coprecipitated hydroxide, and on an as-needed basis, the additional compound are mixed together to obtain a precursor body. In this case, the mixture ratio between the lithium compound, the nickel composite coprecipitated hydroxide, and the additional compound is adjusted in accordance with the composition of the center part 110 (the lithium-nickel composite oxide) to be finally obtained.

In the process of fabricating the precursor body, the specific surface area A is controllable by adjusting the particle size of the secondary particles G2 of the nickel composite coprecipitated hydroxide.

First Firing Process

The precursor body including the lithium compound, the nickel composite coprecipitated hydroxide, and on an as-needed basis, the additional compound is fired. This results in formation of a compound (a lithium-nickel composite oxide) including lithium, nickel, and the additional metal element as constituent elements. As a result, the center part 110 including the lithium-nickel composite oxide is obtained. In the lithium-nickel composite oxide obtained here, most of the primary particles G1 are aggregated to form the secondary particles G2.

Conditions including, without limitation, a firing temperature are not particularly limited, and may be set as desired. The firing temperature is preferably from 650° C. to 850° C. both inclusive in particular. A reason for this is that a lithium-nickel composite oxide having a stable composition is manufactured more easily with superior reproducibility.

In more detail, if the firing temperature is lower than 650° C., it is more difficult for the lithium compound to be diffused, and it is more difficult for the R3m layered rock-salt crystal structure to be formed sufficiently. In contrast, if the firing temperature is higher than 850° C., lithium deficiency occurs more easily in the crystal structure of the lithium-nickel composite oxide due to volatilization of the lithium compound. Further, another atom enters the lithium deficient site (vacant site), which causes the lithium-nickel composite oxide to have a non-stoichiometric composition more easily. Examples of the other atom include nickel ($Ni^{2+}$) having an ion radius substantially equal to the ion radius of lithium ($Li^+$).

In a case where nickel enters the lithium 3d site, a region with the nickel mixed therein becomes a cubic salt phase (a rock-salt domain). The rock-salt domain is electrochemically inert, and the nickel mixed into the lithium site has a property of easily preventing solid-phase diffusion of a phase of only lithium. This easily induces degradation of battery characteristics, including an electrical resistance characteristic, of the secondary battery 10.

In order to suppress occurrence of an unnecessary reduction reaction upon firing the precursor body, it is preferable to fire the precursor body in an oxygen atmosphere. Examples of the above-mentioned reduction reaction include a reduction reaction of nickel ($Ni^{3+} \rightarrow Ni^{2+}$).

In the first firing process, the specific surface area A and the crystallite size Z are each controllable by adjusting the firing temperature.

Water Washing Process

The center part 110 (the lithium-nickel composite oxide) is washed with use of an aqueous solvent such as pure water. In this case, the center part 110 may be mechanically washed with use of an apparatus such as a stirring apparatus on an as-needed basis. Conditions including, without limitation, a washing time are not particularly limited, and may be set as desired.

In the water washing process, the element concentration ratios R1 and R2 are controllable, i.e., the remaining amount of the residual lithium component is controllable, by adjusting the washing time.

Covering Process (Second Firing Process)

The boron compound is mixed with the center part 110 (the lithium-nickel composite oxide), following which the mixture is fired. In this case, the mixture ratio between the center part 110 and the boron compound is adjusted in such a manner that the abundance of boron on the surface of the center part 110, i.e., the amount of boron covering the surface of the center part 110, has a desired value. The boron compound is thus fixed on the surface of the center part 110 to cover the surface of the center part 110. As a result, the covering part 120 including the boron compound is formed. Accordingly, the positive electrode active material 100 including the center part 110 (the lithium-nickel composite oxide) and the covering part 120 (the boron compound) is obtained.

In the covering process (the second firing process), the element concentration ratio R3 is controllable, i.e., the boron-compound covering state of the surface of the lithium-nickel composite oxide is controllable, by adjusting the amount of the added boron compound. In addition, the element concentration ratios R1 and R2 are each controllable by adjusting the firing temperature.

1-3-2. Method of Manufacturing Secondary Battery

In a case of manufacturing the secondary battery 10, for example, a process of fabricating the positive electrode 21, a process of fabricating the negative electrode 22, a process of preparing the electrolytic solution, and a process of assembling the secondary battery 10 are performed in this order, as described below according to an embodiment.

Process of Fabricating Positive Electrode

First, the positive electrode active material 100, the binder, and the conductor are mixed together to thereby obtain a positive electrode mixture. Thereafter, the positive electrode mixture is dispersed in a dispersion solvent to thereby prepare a positive electrode mixture slurry in a paste form. The dispersion solvent is not limited to a particular kind, and examples thereof include an organic solvent such as N-methyl-2-pyrrolidone. Thereafter, the positive electrode mixture slurry is applied on both sides of the positive electrode current collector 21A (the positive-electrode-active-material-layer formation part 21M) to thereby form the positive electrode active material layers 21B. Lastly, the positive electrode active material layers 21B are compression-molded by means of a roll pressing machine. Thus, the positive electrode active material layers 21B are formed on both sides of the positive electrode current collector 21A. As a result, the positive electrode 21 is fabricated.

Process of Fabricating Negative Electrode

First, the negative electrode active material, the binder, and the conductor are mixed together to thereby obtain a negative electrode mixture. Thereafter, the negative electrode mixture is dispersed in a dispersion solvent to thereby prepare a negative electrode mixture slurry in a paste form. The dispersion solvent is not limited to a particular kind, and examples thereof include an organic solvent such as N-methyl-2-pyrrolidone or methyl ethyl ketone. Thereafter, the negative electrode mixture slurry is applied on both sides of the negative electrode current collector 22A (the negative-electrode-active-material-layer formation part 22M) to thereby form the negative electrode active material layers 22B. Lastly, the negative electrode active material layers 22B are compression-molded by means of a roll pressing machine. Thus, the negative electrode active material layers 22B are formed on both sides of the negative electrode current collector 22A. As a result, the negative electrode 22 is fabricated.

Process of Preparing Electrolytic Solution

The electrolyte salt is added to the solvent, following which the solvent is stirred. The electrolyte salt is thus dissolved by the solvent. As a result, the electrolytic solution is prepared.

Process of Assembling Secondary Battery

First, the two or more positive electrodes 21 and the two or more negative electrodes 22 are stacked alternately with the separators 23 interposed therebetween, to thereby form a stacked body. Thereafter, the positive-electrode-current-collector exposed parts 21N are joined to each other, and the positive electrode lead 11 is joined to the joined positive-electrode-current-collector exposed parts 21N. Further, the negative-electrode-current-collector exposed parts 22N are joined to each other, and the negative electrode lead 12 is joined to the joined negative-electrode-current-collector exposed parts 22N. A method of joining each of the positive electrode lead 11 and the negative electrode lead 12 is not particularly limited, and examples thereof include ultrasonic welding, resistance welding, and soldering.

Thereafter, the stacked body is disposed between the first member 30A and the second member 30B, following which the first member 30A and the second member 30B are superposed on each other with the stacked body interposed therebetween. Thereafter, outer edges on three sides other than one side of the first member 30A and corresponding outer edges on the three sides other than the one side of the second member 30B are adhered to each other, to thereby allow the stacked body to be contained in the outer package member 30 having a pouch shape. A method of adhering the first member 30A and the second member 30B to each other is not particularly limited. For example, the first member 30A and the second member 30B may be adhered to each other by a thermal fusion bonding method or with use of an adhesive.

Lastly, the electrolytic solution is injected into the outer package member 30 having the pouch shape, following which the outer edge on the remaining one side of the first member 30A and the outer edge on the remaining one side of the second member 30B are adhered to each other, to thereby seal the outer package member 30. In this case, a sealing film 13 is interposed between the outer package member 30 (the first member 30A and the second member 30B) and the positive electrode lead 11, and another sealing film 13 is interposed between the outer package member 30 and the negative electrode lead 12. The sealing films 13 may each be attached to corresponding one of the positive electrode lead 11 and the negative electrode lead 12 in advance. The stacked body is thereby impregnated with the electrolytic solution, forming the electrode body 20. Further, the electrode body 20 is contained in the outer package member 30. In addition, the positive electrode lead 11 and the negative electrode lead 12 are led out from inside to outside of the outer package member 30. The secondary battery 10 is thus assembled. As a result, the secondary battery 10 of a laminated-film type is completed.

1-4. Action and Effects

The secondary battery 10 includes the positive electrode 21 that includes the positive electrode active material 100 including the center part 110 (the lithium-nickel composite oxide) and the covering part 120 (the boron compound). Further, all of the five conditions (the first to the fifth conditions) related to the configuration and the physical properties of the positive electrode active material 100 described above are provided according to an embodiment. In this case, the decomposition reaction of the electrolytic solution is suppressed and generation of gas is also suppressed while entering and exiting of lithium ions are secured, as described above. This helps to prevent decrease in discharge capacity and swelling of the secondary battery 10 even if the secondary battery 10 is repeatedly charged and discharged. Accordingly, it is possible to obtain superior battery characteristics.

In particular, the specific surface area A of the positive electrode active material 100 may be greater than or equal to 0.53 m$^2$/g and less than or equal to 1.25 m$^2$/g. This sufficiently suppresses the decomposition reaction of the electrolytic solution, and also sufficiently suppresses generation of gas. Accordingly, it is possible to achieve higher effects.

Further, the particle size D50 in the volume-based particle size distribution of the positive electrode active material 100 may be greater than or equal to 11.8 μm and less than or equal to 14.4 μm. This suppresses generation of a short circuit and also suppresses separation of the positive electrode active material layer 21B while securing an energy density per unit weight. Accordingly, it is possible to achieve higher effects. In this case, the particle size D10 may be greater than or equal to 2.8 μm and less than or equal to 4.0 μm, and the particle size D90 may be greater than or equal to 22.7 μm and less than or equal to 26.3 μm. This makes it possible to achieve further higher effects. Further, a compressed density of the positive electrode active material 100 may be higher than or equal to 3.40 g/cm$^3$ and lower than or equal to 3.60 g/cm$^3$. This suppresses generation of gas while securing a high energy density. Accordingly, it is possible to achieve higher effects.

Further, the volume-based particle size distribution of the positive electrode active material 100 may have two or more peaks. This makes it easier for the positive electrode 21 (the positive electrode active material layer 21B) to be packed with the positive electrode active material 100 and helps to prevent the positive electrode active material 100 from cracking easily. As a result, the energy density per unit weight increases, and the decomposition reaction of the electrolytic solution and generation of gas are suppressed. Accordingly, it is possible to achieve higher effects. In this case, the volume-based particle size distribution may have two peaks, i.e., one peak within a range of the particle size that is greater than or equal to 3 μm and less than or equal to 7 μm and another peak within a range of the particle size that is greater than or equal to 14 μm and less than or equal to 30 μm. This makes it easier for the positive electrode active material 100 to form the close-packed structure. Accordingly, it is possible to achieve further higher effects. Further, the compressed density of the positive electrode active material 100 may be higher than or equal to 3.45 g/cm$^3$ and lower than or equal to 3.70 g/cm$^3$. This suppresses generation of gas while securing a high energy density. Accordingly, it is possible to achieve higher effects.

Further, the positive electrode 21, the negative electrode 22, and the electrolytic solution may be contained in the outer package member 30 having a film shape. This suppresses generation of gas as described above in the secondary battery 10 of the laminated-film type using the outer package member 30 which is easily deformed due to a change in internal pressure. Accordingly, it is possible to effectively suppress swelling of the secondary battery 10 also in a case of using the secondary battery 10 of the laminated-film type whose swelling is visually recognized easily.

Other than the above, the positive electrode active material 100 used in the secondary battery 10 includes the center part 110 (the lithium-nickel composite oxide) and the covering part 120 (the boron compound), and all of the above-described five conditions related to the configuration and the physical properties of the positive electrode active material 100 are satisfied. Therefore, the configuration and the physical properties of the positive electrode active material 100 are made appropriate for the reasons described above. Accordingly, the secondary battery 10 using such a positive electrode active material 100 achieves superior battery characteristics.

2. Modifications

The above-described configuration of the secondary battery 10 is appropriately modifiable, for example, as will be described below according to an embodiment. It should be understood that any two or more of the following series of modifications may be combined.

Modification 1

Figure 9:
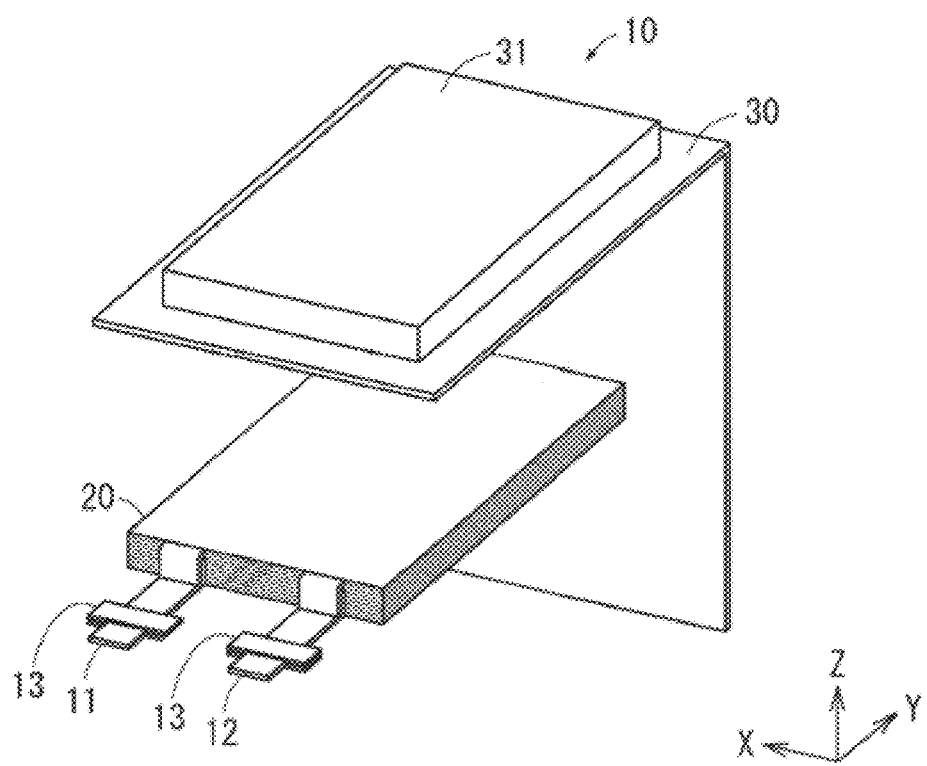
FIG. 9 is an exploded perspective view of a configuration of a secondary battery according to Modification 1.

The two pieces of outer package member 30, i.e., the first member 30A and the second member 30B, have been used as illustrated in FIG. 1. In another embodiment, as illustrated in FIG. 9 corresponding to FIG. 1, a single piece of outer package member 30 which is foldable may be used instead of the two pieces of outer package member 30. The single piece of outer package member 30 has, for example, a configuration in which one side of the first member 30A and one side of the second member 30B opposing thereto are coupled to each other. The electrode body 20 is contained in the outer package member 30 also in this case. Accordingly, it is possible to achieve similar effects.

Modification 2

The electrolytic solution is a liquid electrolyte as previously described. In another embodiment, an electrolyte layer that is a gel electrolyte may be used instead of the electrolytic solution. In this case, the electrode body 20 includes the electrolyte layer. In such an electrode body 20, the positive electrodes 21 and the negative electrodes 22 are stacked alternately with the separators 23 and the electrolyte layers interposed therebetween. Some of the electrolyte layers are each interposed between the positive electrode 21 and the separator 23. The other of the electrolyte layers are each interposed between the negative electrode 22 and the separator 23. The electrolyte layers each include an electrolytic solution and a polymer material holding the electrolytic solution. The polymer material is swollen with the electrolytic solution. The gel electrolyte achieves high ionic conductivity and helps to reduce leakage of the electrolytic solution. The mixture ratio between the electrolytic solution and the polymer material may be set as desired. The polymer material may be, for example, a homopolymer such as polyvinylidene difluoride, or a copolymer such as a copolymer of vinylidene fluoride and hexafluoropylene, or may include both the homopolymer and the copolymer. Lithium ions are movable between the positive electrodes 21 and the negative electrodes 22 via the electrolyte layers also in this case. Accordingly, it is possible to achieve similar effects.

Modification 3

The separators 23 may each include, for example, a base layer and a polymer layer provided on the base layer. The polymer layer may be provided on only one side of the base layer or on each of both sides of the base layer.

The base layer is, for example, the porous film described above. The polymer layer includes, for example, a polymer material such as polyvinylidene difluoride. A reason for this is that such a polymer material has superior physical strength and is electrochemically stable. For example, the polymer layer may include inorganic particles. A reason for this is that, upon increase in temperature of the secondary battery 10 due to a cause such as heat generation, the inorganic particles release the heat, which improves safety of the secondary battery 10. The inorganic particles are not limited to a particular kind, and examples thereof include insulating particles of a material such as aluminum oxide or aluminum nitride. The separator 23 including the base layer and the polymer layer is formed, for example, by applying a precursor solution including, for example but not limited to, a polymer material and an organic solvent on both sides of the base layer.

The positive electrodes 21 and the negative electrodes 22 are separated from each other with the separators 23 interposed therebetween also in this case. Accordingly, it is possible to achieve similar effects. In a case where the separators 23 each include the polymer layer, the electrolyte layer is omittable. A reason for this is that impregnating the polymer layer with the electrolytic solution provides a function similar to that of the electrolyte layer to the polymer layer swollen with the electrolytic solution.

Modification 4

The electrode body 20 of a stacked type including the positive electrodes 21 and the negative electrodes 22 are stacked alternately with the separators 23 interposed therebetween as previously described. In another embodiment, the electrode body 20 is not limited to a particular configuration. Specifically, the electrode body 20 may be, for example, of a folded type in which a single positive electrode 21 and a single negative electrode 22 are folded with the separator 23 interposed therebetween, or of a wound type in which a single positive electrode 21 and a single negative electrode 22 are wound with the separator 23 interposed therebetween. It is possible to perform charging and discharging with use of the positive electrode 21 and the negative electrode 22 also in these cases. Accordingly, it is possible to achieve similar effects.

3. Applications of Secondary Battery

Applications of the secondary battery are not particularly limited and can include, for example, machines, apparatuses, instruments, devices, or systems (assemblies of a plurality of apparatuses, for example) in which the secondary battery is usable as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specifically, examples of the applications of the secondary battery include: electronic apparatuses including portable electronic apparatuses; portable life appliances; storage devices; electric power tools; battery packs mountable on laptop personal computers or other apparatuses as detachable power sources; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the secondary battery may have applications other than those described above.

EXAMPLES

Examples of the present technology are described below according to an embodiment.

Experiment Examples 1-1 to 1-23

As described below, the positive electrode active material 100 illustrated in FIG. 5 was synthesized and the secondary battery 10 of the laminated-film type illustrated in FIGS. 1 to 4 was fabricated to evaluate physical properties of the positive electrode active material 100 and battery characteristics of the secondary battery 10.

Synthesis of Positive Electrode Active Material

In the precursor-body fabrication process, first, a nickel compound (nickel sulfate ($NiSO_4$)) and an additional compound (cobalt sulfate ($CoSO_4$)) were put into an aqueous solvent (pure water), following which the aqueous solvent was stirred to thereby obtain a mixture aqueous solution. In this case, the mixture ratio between the nickel compound and the cobalt compound was adjusted in such a manner that the molar ratio between nickel and cobalt was 84:16.

Thereafter, an alkali compound (lithium hydroxide (NaOH) and ammonium hydroxide ($NH_4OH$)) was added to the mixture aqueous solution while the mixture aqueous solution was stirred, to thereby obtain a precipitate in a form of particles (secondary particles G2 of a nickel-cobalt composite coprecipitated hydroxide) by a coprecipitation method. In this case, in order to finally use the positive electrode active material 100 having two kinds of average particle sizes (median diameters), i.e., the positive electrode active material 100 of a bi-model design including large-sized particles and small-sized particles, the particle sizes of the secondary particles G2 were controlled. As a result, secondary particles G2 having two different kinds of average particle sizes were obtained.

Thereafter, the nickel-cobalt composite coprecipitated hydroxide was washed with use of an aqueous solvent (pure water), following which the washed nickel-cobalt composite coprecipitated hydroxide was dried.

Lastly, a lithium compound (lithium hydroxide monohydrate ($LiOH \cdot H_2O$)) and an additional compound (aluminum hydroxide ($Al(OH)_3$)) were added to the nickel-cobalt composite coprecipitated hydroxide, to thereby obtain a precursor body. In this case, the mixture ratio between the nickel-cobalt composite coprecipitated hydroxide, the lithium compound, and the additional compound was adjusted in such a manner that the molar ratio between lithium and the sum total of nickel, cobalt, and aluminum was 103:100.

In the first firing process, the precursor body was fired in an oxygen atmosphere. The firing temperature (° C.) in the first firing process was as given in Table 1. A lithium-nickel composite oxide ($LiNi_{0.82}Co_{0.14}Al_{0.04}O_2$) in a form of particles was thereby synthesized. As a result, the center part 110 including the lithium-nickel composite oxide was obtained.

In the water washing process, first, 50 g of the center part 110 and 500 ml (500 $cm^3$) of an aqueous solvent (pure water) were put into a beaker having a volume of 1000 ml (=1000 cm$^3$). Thereafter, the aqueous solvent was stirred with use of a stirring apparatus to thereby wash the center part 110 with use of the aqueous solvent. A washing time (min) was as given in Table 1. Thereafter, the aqueous solvent was transferred into a suction filter, following which the filtrate was dehydrated (dehydration time=10 min). Thereafter, the filtrate was dried (drying temperature=120° C.). Thereafter, the filtrate was pulverized with use of an agate mortar, following which the pulverized material was dried in a vacuum (drying temperature=100° C.). As a result, the washed center part 110 was obtained.

In the covering process (the second firing process), the center part 110 and a boron compound (boric acid ($H_3BO_3$)) were mixed together to thereby obtain a mixture. The amount (mass %) of the added boric acid, i.e., the rate of the mass of the boric acid to the mass of the center part 110, was as given in Table 1. Thereafter, the mixture was fired in an oxygen atmosphere. The firing temperature (° C.) in the second firing process was as given in Table 1. The surface of the center part 110 (the lithium-nickel composite oxide) was thereby covered with the covering part 120 (the boron compound), as illustrated in FIG. 5. As a result, the positive electrode active material 100 was obtained.

As listed in Table 1, other lithium-nickel composite oxides in forms of particles were also synthesized to thereby obtain other positive electrode active materials 100.

Specifically, the other positive electrode active materials 100 were each obtained by a similar procedure, except that the molar ratio between lithium, nickel, cobalt, and aluminum was changed to synthesize each of $LiNi_{0.78}Co_{0.18}Al_{0.04}O_2$ and $LiNi_{0.90}Co_{0.06}Al_{0.04}O_2$ instead of $LiNi_{0.52}Co_{0.14}Al_{0.04}O_2$.

Further, the other positive electrode active materials 100 were each obtained by a similar procedure, except that manganese hydroxide ($Mn(OH)_2$) was used instead of aluminum hydroxide as the additional compound, and the molar ratio between lithium, nickel, cobalt, and manganese was changed to synthesize $LiNi_{0.84}Co_{0.08}Mn_{0.08}O_2$ instead of $LiNi_{0.82}Co_{0.14}Al_{0.04}O_2$.

TABLE 1

| Experiment example | First firing process Firing temperature (° C.) | Water washing process Washing time (min) | Covering process (Second firing process) Amount of addition (mass %) | Covering process (Second firing process) Firing temperature (° C.) |
|---|---|---|---|---|
| 1-1 | 700 | 120 | 0.30 | 300 |
| 1-2 | 700 | 150 | 0.30 | 300 |
| 1-3 | 700 | 90 | 0.30 | 300 |
| 1-4 | 700 | 120 | 0.30 | 400 |
| 1-5 | 700 | 120 | 0.30 | 200 |
| 1-6 | 700 | 120 | 0.50 | 300 |
| 1-7 | 700 | 120 | 0.10 | 300 |
| 1-8 | 850 | 120 | 0.30 | 300 |
| 1-9 | 650 | 120 | 0.30 | 300 |
| 1-10 | 700 | 120 | 0.30 | 300 |
| 1-11 | 700 | 120 | 0.30 | 300 |
| 1-12 | 700 | 120 | 0.30 | 300 |
| 1-13 | 700 | 180 | 0.30 | 300 |
| 1-14 | 700 | 60 | 0.30 | 300 |
| 1-15 | 700 | 120 | 0.30 | 450 |
| 1-16 | 700 | 120 | 0.30 | 250 |
| 1-17 | 700 | 120 | 0.55 | 300 |
| 1-18 | 700 | 120 | 0.05 | 300 |
| 1-19 | 900 | 120 | 0.30 | 300 |
| 1-20 | 600 | 120 | 0.30 | 300 |
| 1-21 | 700 | 180 | 0.30 | 300 |
| 1-22 | 700 | 180 | 0.30 | 300 |
| 1-23 | 700 | 180 | 0.30 | 300 |

The positive electrode active material 100 was analyzed by the XRD, following which the crystallite size Z (nm) was calculated by the Scherrer equation on the basis of a result of the analysis (a (104) plane peak). This revealed the results given in Table 2 and Table 3. Further, the specific surface area A (m$^2$/g) of the positive electrode active material 100 was measured by the BET specific surface area measurement method, which revealed the results given in Table 2 and Table 3. The "appropriate range (m$^2$/g)" given in Table 2 and Table 3 refers to an appropriate range of the specific surface area A calculated by Expression (2). That is, of the two numerical values given in the "appropriate range (m$^2$/g)" column, the numerical value on the left is a value calculated by $-0.0160 \times Z + 1.72$, and the numerical value on the right is a value calculated by $-0.0324 \times Z + 2.94$.

Further, after analyzing the positive electrode active material 100 by the XPS, the element concentration ratios R1 to R3 were calculated on the basis of the result of the analysis. This revealed the results given in Table 2 and Table 3.

TABLE 2

| Experiment Example | Crystallite size Z (nm) | Specific surface area A (m$^2$/g) | Appropriate range (m$^2$/g) | Element concentration ratio R1 | Element concentration ratio R2 | Element concentration ratio R3 | Initial capacity (normalized) | Capacity retention rate (%) | Gas generation amount (cm$^3$/g) | Remaining rate (%) Li$_2$CO$_3$ | Remaining rate (%) LiOH |
|---|---|---|---|---|---|---|---|---|---|---|---|
| 1-1 | 52.0 | 1.07 | 0.89-1.26 | 0.11 | 1.00 | 0.40 | 100 | 90 | 3 | 0.20 | 0.30 |
| 1-2 | 52.0 | 1.25 | 0.89-1.26 | 0.11 | 1.00 | 0.40 | 100 | 85 | 2 | 0.18 | 0.30 |
| 1-3 | 52.0 | 0.89 | 0.89-1.26 | 0.70 | 1.40 | 0.40 | 100 | 95 | 5 | 0.25 | 0.30 |
| 1-4 | 52.0 | 0.94 | 0.89-1.26 | 0.80 | 1.50 | 0.40 | 100 | 94 | 6 | 0.20 | 0.30 |
| 1-5 | 52.0 | 1.20 | 0.89-1.26 | 0.08 | 0.60 | 0.40 | 100 | 86 | 4 | 0.20 | 0.30 |
| 1-6 | 52.0 | 0.92 | 0.89-1.26 | 0.11 | 1.00 | 0.90 | 98 | 95 | 3 | 0.20 | 0.30 |
| 1-7 | 52.0 | 1.19 | 0.89-1.26 | 0.11 | 1.00 | 0.15 | 101 | 85 | 6 | 0.20 | 0.30 |
| 1-8 | 74.5 | 0.53 | 0.53-0.53 | 0.11 | 1.00 | 0.40 | 100 | 85 | 3 | 0.20 | 0.30 |

TABLE 2-continued

| Experiment Example | Crystallite size Z (nm) | Specific surface area A (m²/g) | Appropriate range (m²/g) | Element concentration ratio R1 | Element concentration ratio R2 | Element concentration ratio R3 | Initial capacity (normalized) | Capacity retention rate (%) | Gas generation amount (cm³/g) | Remaining rate (%) Li₂CO₃ | Remaining rate (%) LiOH |
|---|---|---|---|---|---|---|---|---|---|---|---|
| 1-9  | 40.0 | 1.08 | 1.08-1.64 | 0.11 | 1.00 | 0.40 | 100 | 96 | 5 | 0.20 | 0.30 |
| 1-10 | 52.0 | 1.07 | 0.89-1.26 | 0.11 | 1.00 | 0.40 | 97  | 93 | 3 | 0.20 | 0.30 |
| 1-11 | 52.0 | 1.07 | 0.89-1.26 | 0.11 | 1.00 | 0.40 | 107 | 87 | 3 | 0.20 | 0.30 |
| 1-12 | 52.0 | 1.07 | 0.89-1.26 | 0.11 | 1.00 | 0.40 | 107 | 88 | 3 | 0.20 | 0.30 |

Positive electrode active material of Experiment examples 1-1 to 1-9: Center part (LiNi$_{0.82}$Co$_{0.14}$Al$_{0.04}$O$_2$) + Covering part (H$_3$BO$_3$)
Positive electrode active material of Experiment example 1-10: Center part (LiNi$_{0.78}$Co$_{0.18}$Al$_{0.04}$O$_2$) + Covering part (H$_3$BO$_3$)
Positive electrode active material of Experiment example 1-11: Center part (LiNi$_{0.90}$Co$_{0.06}$Al$_{0.04}$O$_2$) + Covering part (H$_3$BO$_3$)
Positive electrode active material of Experiment example 1-12: Center part (LiNi$_{0.84}$Co$_{0.08}$Mn$_{0.08}$O$_2$) + Covering part (H$_3$BO$_3$)
Appropriate range (m²/g): from $-0.0160 \times Z + 1.72$ to $-0.0324 \times Z + 2.94$
Initial capacity (normalized): Normalized value with respect to value of initial capacity of Experiment example 1-1 assumed as 100

TABLE 3

| Experiment Example | Crystallite size Z (nm) | Specific surface area A (m²/g) | Appropriate range (m²/g) | Element concentration ratio R1 | Element concentration ratio R2 | Element concentration ratio R3 | Initial capacity (normalized) | Capacity retention rate (%) | Gas generation amount (cm³/g) | Remaining rate (%) Li₂CO₃ | Remaining rate (%) LiOH |
|---|---|---|---|---|---|---|---|---|---|---|---|
| 1-13 | 52.0 | 1.36 | 0.89-1.26 | 0.11 | 1.00 | 0.40 | 100 | 82 | 2  | 0.15 | 0.30 |
| 1-14 | 52.0 | 0.85 | 0.89-1.26 | 0.85 | 1.60 | 0.40 | 100 | 96 | 9  | 0.40 | 0.30 |
| 1-15 | 52.0 | 0.86 | 0.89-1.26 | 0.90 | 1.80 | 0.40 | 100 | 95 | 10 | 0.20 | 0.30 |
| 1-16 | 52.0 | 1.23 | 0.89-1.26 | 0.05 | 0.40 | 0.40 | 100 | 83 | 2  | 0.20 | 0.30 |
| 1-17 | 52.0 | 0.90 | 0.89-1.26 | 0.11 | 1.00 | 1.00 | 95  | 97 | 4  | 0.20 | 0.30 |
| 1-18 | 52.0 | 1.23 | 0.89-1.26 | 0.11 | 1.00 | 0.05 | 102 | 80 | 8  | 0.20 | 0.30 |
| 1-19 | 76.0 | 0.54 | 0.50-0.48 | 0.11 | 1.00 | 0.40 | 100 | 81 | 2  | 0.20 | 0.30 |
| 1-20 | 38.0 | 1.05 | 1.11-1.71 | 0.11 | 1.00 | 0.40 | 100 | 95 | 9  | 0.20 | 0.30 |
| 1-21 | 52.0 | 1.34 | 0.89-1.26 | 0.11 | 1.00 | 0.40 | 97  | 83 | 2  | 0.12 | 0.30 |
| 1-22 | 52.0 | 1.38 | 0.89-1.26 | 0.11 | 1.00 | 0.40 | 107 | 79 | 3  | 0.18 | 0.30 |
| 1-23 | 52.0 | 1.32 | 0.89-1.26 | 0.11 | 1.00 | 0.40 | 107 | 81 | 3  | 0.16 | 0.30 |

Positive electrode active material of Experiment examples 1-13 to 1-20: Center part (LiNi$_{0.82}$Co$_{0.14}$Al$_{0.04}$O$_2$) + Covering part (H$_3$BO$_3$)
Positive electrode active material of Experiment example 1-21: Center part (LiNi$_{0.78}$Co$_{0.18}$Al$_{0.04}$O$_2$) + Covering part (H$_3$BO$_3$)
Positive electrode active material of Experiment example 1-22: Center part (LiNi$_{0.90}$Co$_{0.06}$Al$_{0.04}$O$_2$) + Covering part (H$_3$BO$_3$)
Positive electrode active material of Experiment example 1-23: Center part (LiNi$_{0.84}$Co$_{0.08}$Mn$_{0.08}$O$_2$) + Covering part (H$_3$BO$_3$)
Appropriate range (m²/g): from $-0.0160 \times Z + 1.72$ to $-0.0324 \times Z + 2.94$
Initial capacity (normalized): Normalized value with respect to value of initial capacity of Experiment example 1-1 assumed as 100

In addition, the compressed density of the positive electrode active material 100 was measured, which was 3.60 g/cm³. The particle sizes in the volume-based particle size distribution of the positive electrode active material 100 were measured, which revealed that the particle size D50 was 13.2 μm, the particle size D10 was 3.4 μm, and the particle size D90 was 24.5 μm.

Further, the volume-based particle size distribution of the positive electrode active material 100 was measured. As a result, two peaks P, i.e., a peak P1 corresponding to small-sized particles and a peak P2 corresponding to large-sized particles, were obtained as illustrated in FIG. 8. In the volume-based particle size distribution, the particle size (the particle size at the top of the peak) corresponding to the first peak P1 was 4.4 μm, and the particle size corresponding to the second peak P2 was 19.1 μm. The mixture ratio (weight ratio) between the small-sized particles and the large-sized particles was set to 30:70.

Fabrication of Secondary Battery

In a process of fabricating the positive electrode 21, first, 95.5 parts by mass of the above-described positive electrode active material 100 (the center part 110 and the covering part 120), 1.9 parts by mass of a binder (polyvinylidene difluoride), 2.5 parts by mass of a conductor (carbon black), and 0.1 parts by mass of a dispersant (polyvinylpyrrolidone) were mixed together to thereby obtain a positive electrode mixture. Thereafter, the positive electrode mixture was put into an organic solvent (N-methyl-2-pyrrolidone), following which the organic solvent was stirred to thereby prepare a positive electrode mixture slurry in a paste form. Thereafter, the positive electrode mixture slurry was applied on both sides of the positive-electrode-active-material-layer formation part 21M of the positive electrode current collector 21A (an aluminum foil having a thickness of 15 μm) by means of a coating apparatus, following which the applied positive electrode mixture slurry was dried to thereby form the positive electrode active material layers 21B. Lastly, the positive electrode active material layers 21B were compression-molded by means of a roll pressing machine.

In a process of fabricating the negative electrode 22, first, 90 parts by mass of a negative electrode active material (graphite) and 10 parts by mass of a binder (polyvinylidene difluoride) were mixed together to thereby obtain a negative electrode mixture. Thereafter, the negative electrode mixture was put into an organic solvent (N-methyl-2-pyrrolidone), following which the organic solvent was stirred to thereby prepare a negative electrode mixture slurry in a paste form. Thereafter, the negative electrode mixture slurry was applied on both sides of the negative-electrode-active-material-layer formation part 22M of the negative electrode current collector 22A (a copper foil having a thickness of 15 μm) by means of a coating apparatus, following which the applied negative electrode mixture slurry was dried to thereby form the negative electrode active material layers 22B. Lastly, the negative electrode active material layers 22B were compression-molded by means of a roll pressing machine.

In a process of preparing the electrolytic solution, an electrolyte salt (lithium hexafluorophosphate) was added to a solvent (ethylene carbonate and ethyl methyl carbonate), following which the solvent was stirred. In this case, the mixture ratio (the mass ratio) between ethylene carbonate and ethyl methyl carbonate in the solvent was set to 50:50, and the content of the electrolyte salt with respect to the solvent was set to 1 mol/kg.

In a process of assembling the secondary battery 10, first, the positive electrodes 21 and the negative electrodes 22 were stacked alternately with the separators 23 (fine porous polyethylene films each having a thickness of 25 μm) interposed therebetween to thereby form a stacked body. Thereafter, the positive-electrode-current-collector exposed parts 21N were joined to each other and the negative-electrode-current-collector exposed parts 22N were joined to each other by ultrasonic welding. Thereafter, the positive electrode lead 11 was joined to the joined body of the positive-electrode-current-collector exposed parts 21N and the negative electrode lead 12 was joined to the joined body of the negative-electrode-current-collector exposed parts 22N by ultrasonic welding.

Thereafter, two pieces of outer package member 30, i.e., the first member 30A and the second member 30B, were prepared. As each piece of the outer package member 30, a moisture-proof aluminum laminated film was used in which a thermal-fusion-bonding resin layer (a polypropylene film having a thickness of 30 μm), a metal layer (an aluminum foil having a thickness of 40 μm), and a surface protective layer (a nylon film having a thickness of 25 μm) were stacked in this order. Thereafter, the stacked body was disposed between the first member 30A and the second member 30B, following which the outer edges on three sides of the first member 30A (a thermal-fusion-bonding resin layer) and the outer edges on three sides of the second member 30B (a thermal-fusion-bonding resin layer) were adhered to each other by a thermal fusion bonding method, to thereby allow the stacked body to be contained in the outer package member 30 having a pouch shape.

Lastly, the electrolytic solution was injected into the outer package member 30 having the pouch shape, following which the outer package member 30 was sealed by a thermal fusion bonding method. In this case, the sealing film 13 (a polypropylene film having a thickness of 15 μm) was interposed between the outer package member 30 (the first member 30A and the second member 30B) and the positive electrode lead 11, and another sealing film 13 was interposed between the outer package member 30 and the negative electrode lead 12. The stacked body was thereby impregnated with the electrolytic solution, forming the electrode body 20. Further, the electrode body 20 was contained in the outer package member 30 while the positive electrode lead 11 and the negative electrode lead 12 were led out from inside to outside of the outer package member 30. As a result, the secondary battery 10 of the laminated-film type illustrated in FIGS. 1 to 4 was completed.

Evaluation of Battery Characteristics

Evaluation of the battery characteristics of the secondary batteries 10 revealed the results given in Table 2 and Table 3. Here, an initial capacity characteristic and a cyclability characteristic were examined as the battery characteristics of the secondary battery 10, and a gas generation characteristic was examined in order to examine the physical properties of the positive electrode active material 100. In this case, the remaining amount of the residual lithium component (lithium carbonate ($Li_2CO_3$) and lithium hydroxide (LiOH)) was also examined by the procedure described above.

In a case of examining the initial capacity characteristic of the secondary battery 10, first, the secondary battery 10 was charged and discharged for one cycle in an ambient temperature environment (temperature=23° C.) in order to stabilize a state of the secondary battery 10. Thereafter, the secondary battery 10 was charged and discharged again in the same environment, and an initial capacity (a second-cycle discharge capacity) was measured. The values of the initial capacities given in Table 2 and Table 3 are normalized with respect to the initial capacity of Experiment example 1-1 assumed as 100.

Upon the charging, the secondary battery 10 was charged with a constant current of 0.1 C until a battery voltage reached 4.2 V, and was thereafter charged with a constant battery voltage of 4.2 V until a current reached 0.005 C. Upon the discharging, the secondary battery 10 was discharged with a constant current of 0.1 C until the battery voltage reached 2.5 V. Note that 0.1 C is a value of a current that causes a battery capacity (a theoretical capacity) to be completely discharged in 10 hours, and 0.005 C is a value of a current that causes a battery capacity to be completely discharged in 200 hours.

In a case of examining the cyclability characteristic of the secondary battery 10, after stabilizing the state of the secondary battery 10 by the above-described procedure, first, the secondary battery 10 was charged and discharged for one cycle in a high temperature environment (temperature=60° C.), and a discharge capacity (a second-cycle discharge capacity) was measured. Thereafter, the secondary battery 10 was charged and discharged for 100 cycles in the same environment, and the discharge capacity (a 102nd-cycle discharge capacity) was measured. Lastly, a capacity retention rate (%) was calculated as follows: capacity retention rate (%)=(102nd-cycle discharge capacity/second-cycle discharge capacity)–100.

Upon the charging, the secondary battery 10 was charged with a constant current of 1.0 C until a battery voltage reached 4.2 V, and was thereafter charged with a constant battery voltage of 4.2 V until a total charging time reached 2.5 hours. Upon the discharging, the secondary battery 10 was discharged with a constant current of 5.0 C until the battery voltage reached 2.5 V. Note that 1.0 C is a value of a current that causes a battery capacity to be completely discharged in 1 hour, and 5.0 C is a value of a current that causes a battery capacity to be completely discharged in 0.2 hours.

In a case of examining the gas generation characteristic of the positive electrode active material 100, first, the positive electrodes 21 and the negative electrodes 22 were stacked on each other with the separators 23 interposed therebetween to thereby obtain a stacked body. Thereafter, a laminated film with a pre-attached tab allowing for charging and discharging was folded, following which the stacked body was interposed in the folded laminated film. Thereafter, the outer edges on two sides of the laminated film were thermally fusion-bonded to allow the stacked body to be contained in the laminated film having a pouch shape. Thereafter, the electrolytic solution was injected into the pouch-shaped laminated film, following which the outer edges on the remaining one side of the laminated film were thermally fusion-bonded to thereby obtain a laminated pack. Thereafter, pressure was applied to the laminated pack (pressure=500 kPa; pressure application time=30 seconds). The stacked body was thereby impregnated with the electrolytic solution. As a result, a laminated cell for evaluation was fabricated.

Thereafter, the laminated cell for evaluation was charged (constant current charging) with a current of 0.1 C until the voltage reached 4.2 V, and the laminated cell for evaluation was charged (constant voltage charging) at the voltage of 4.2 V until the total charging time reached 2.5 hours, following which the volume (a pre-storage volume: $cm^3$) of the laminated cell for evaluation was measured by the Archimedes' method. Thereafter, the laminated cell for evaluation in the charged state was stored (storage time=1 week) in a constant temperature bath (temperature=60° C.), following which the volume (a post-storage volume) of the laminated cell for evaluation was measured again by the Archimedes' method. Lastly, the gas generation amount was calculated as follows: gas generation amount (cc/g=$cm^3$/g)=[post-storage volume ($cm^3$)–pre-storage volume ($cm^3$)]/weight (g) of positive electrode active material 100. This gas generation amount is a so-called gas generation amount per unit weight of the positive electrode active material 100. Therefore, the gas generation amount serves as an index representing a physical property (a gas generation characteristic) of the positive electrode active material 100, and also serves as a parameter for estimating a swelling characteristic of the secondary battery 10 accordingly.

Appropriate Range of Specific Surface Area

Now, a description is given for deriving Expression (2) that defines the appropriate range of the specific surface area A in relation to the crystallite size Z.

In a case of deriving Expression (2), first, the capacity retention rate (%) was examined while each of the crystallite size Z and the specific surface area A was changed, in accordance with the procedure for examining the cyclability characteristic described above, to thereby obtain a correspondence relationship between the capacity retention rate and each of the crystallite size Z and the specific surface area A. In this case, the crystallite size Z was set within a range from 40.0 nm to 80.0 nm both inclusive, and the specific surface area A was set within a range from 0.40 $m^2$/g to 1.80 $m^2$/g both inclusive.

Thereafter, the allowable range of the capacity retention rate was set to 85% or higher (the lower limit of the allowable capacity retention rate=85%), and the respective values of the crystallite size Z and the specific surface area A in the case where the capacity retention rate was 85% were determined, which were plotted.

Thereafter, a multiple regression analysis was conducted with use of a result obtained by plotting the values of the crystallite size Z and the specific surface area A, to thereby obtain a first straight line L (a solid line Li) illustrated in FIG. 5. This allowed for estimation of the capacity retention rate based on the crystallite size Z and the specific surface area A.

Thereafter, the specific surface area A ($m^2$/g) was examined while the washing time in the water washing process was changed, to thereby obtain a correspondence relationship between the washing time and the specific surface area A. In this case, the specific surface area A was set within a range from 0.40 $m^2$/g to 1.80 $m^2$/g both inclusive. Thereafter, respective values of the water washing time and the specific surface area A were plotted. Linear approximation was performed with use of the plotted values to thereby obtain an approximate line. Thereafter, the allowable range of the gas generation amount was set to 6 $cm^3$/g or less (the upper limit of the allowable gas generation amount=6 $cm^3$/g), and the specific surface area A in the case where the gas generation amount was 6 $cm^3$/g was determined with use of the approximate line.

Thereafter, the specific surface area A was examined while the crystallite size Z was changed, to thereby determine the specific surface area A in the case where the gas generation amount was 6 $cm^3$/g for each crystallite size Z by a similar procedure. In this case, the crystallite size Z was set within a range from 40.0 nm to 80.0 nm both inclusive.

Thereafter, the values of the crystallite size Z and the specific surface area A in the case where the gas generation amount was 6 $cm^3$/g were plotted to thereby obtain a second straight line (a broken line L2) illustrated in FIG. 5. This allowed for estimation, for each crystallite size Z, of an upper limit value of the specific surface area A varying in accordance with the variation in washing time.

Lastly, the two straight lines (the solid line L1 and the broken line L2) were placed on the same graph to determine the range Q defined by the solid line LI and the broken line L2 as illustrated in FIG. 6, which is the appropriate range represented by Expression (2). The range Q is the range, of the crystallite size Z and the range of the specific surface area A, within which the capacity retention rate is 85 or higher and where the specific surface area A has the upper limit value varying in accordance with the variation in washing time for each crystallite size Z. The range Q is theoretically derived using a method such as the multiple regression analysis described above.

Discussion

As given in Table 2 and Table 3, in a case where the positive electrode active material 100 including the center part 110 (the lithium-nickel composite oxide) and the covering part 120 (the boron compound) was used, the initial capacity, the capacity retention rate, and the gas generation amount each varied in accordance with the crystallite size Z, the specific surface area A, and the element concentration ratios R1 to R3.

Specifically, in a case where all of the five conditions: the crystallite size Z within a range from 40.0 nm to 74.5 nm both inclusive; the specific surface area A within the appropriate range; the element concentration ratio R1 within a range from 0.08 to 0.80 both inclusive; the element concentration ratio R2 within a range from 0.60 to 1.50 both inclusive; and the element concentration ratio R3 within a range from 0.15 to 0.90 both inclusive, were satisfied (Experiment examples 1-1 to 1-12), the amount of gas generation due to the positive electrode active material 100 was reduced, as compared with a case where not all of the five conditions were satisfied (Experiment examples 1-13 to 1-23). Accordingly, the initial capacity was secured and a high capacity retention rate was obtained while the gas generation amount was reduced in the case where all of the five conditions were satisfied.

Thus, the range of the specific surface area A represented by Expression (2), i.e., the range of the specific surface area A defined in relation to the crystallite size Z (the range Q illustrated in FIG. 6), was confirmed to be an appropriate range that contributes to securing the capacity retention rate and reducing the gas generation amount.

In particular, in the case where all of the five conditions were satisfied, if the specific surface area A was within a range from 0.53 $m^2$/g to 1.25 $m^2$/g both inclusive, a sufficiently high battery capacity was obtained and a sufficiently high capacity retention rate was obtained while the gas generation amount was sufficiently reduced.

In a case where all of the five conditions were satisfied, the remaining rate of the lithium carbonate was substantially the same or less and the remaining rate of the lithium hydroxide was the same, as compared with the case where not all of the five conditions were satisfied.

However, as described with reference to FIG. 7, the analyzable range (a range F1) of the residual lithium component in an analysis conducted by the XPS is relatively narrow. In contrast, the measurable range (a range F2) of the residual lithium component in a measurement conducted by the Warder method is relatively wide. For this reason, the gas generation amount increased in some cases even if the remaining amount of the residual lithium component such as lithium carbonate measured by the Warder method was small. The cause of such increase in gas generation amount may be described as follows. Even if the water washing time is secured in the water washing process to reduce the remaining amount of the residual lithium component, lithium elutes from the inside of the positive electrode active material 100 (the lithium-nickel composite oxide) in a case where the firing temperature is increased in the covering process (the second firing process). This causes lithium carbonate to be newly formed in the vicinity of the uppermost surface of the positive electrode active material 100. In a case of using the Warder method with the wide measurable range (the range F2), the amount of lithium carbonate in the vicinity of the uppermost surface of the positive electrode active material 100 cannot be measured. In contrast, in a case of using XPS with the narrow measurable range (the range F1), the amount of a gas generation source (the eluted lithium) in the vicinity of the uppermost surface of the positive electrode active material 100 can be quantified. Accordingly, if there is a lot of gas generation source in the vicinity of the uppermost surface of the positive electrode active material 100, it can be considered that the amount of gas generation in the secondary battery 10 is increased.

Other Evaluations and Other Discussions

A further evaluation of the present technology is provided below according to an embodiment.

Experiment Examples 2-1 to 2-4

As given in Table 4, secondary batteries were fabricated and a battery characteristic (a cyclability characteristic) of each of the fabricated secondary batteries was evaluated by a similar procedure, except that the particle sizes D10, D50, and D90 (μm) in the volume-based particle size distribution of the positive electrode active material 100 were changed. In this case, as given in Table 4, each of the particle sizes D10, D50, and D90 was changed by changing the mixture ratio (weight ratio) between the small-sized particles and the large-sized particles. In accordance therewith, the compressed density (g/cm$^3$) of the positive electrode active material 100 was also changed.

Table 4

Positive electrode active material: Center part $(LiNi_{0.82}Co_{0.14}Al_{0.04}O_2)$+Covering part $(H_3BO_3)$ Crystallite size Z=52.0 nm, Specific surface area A=1.07 m$^2$/g, Element concentration ratio R1=0.11, Element concentration ratio R2=1.00, Element concentration ratio R3=0.40

| Experiment example | Particle diameter (μm) | | | Mixture ratio (Weight ratio) Small-sized particle: Large-sized particle | Compressed density (g/cm$^3$) | Capacity retention rate (%) |
|---|---|---|---|---|---|---|
| | D10 | D50 | D90 | | | |
| 1-1 | 3.4 | 13.2 | 24.5 | 30:70 | 3.60 | 90 |
| 2-1 | 4.0 | 14.4 | 26.3 | 15:85 | 3.53 | 88 |
| 2-2 | 2.8 | 11.8 | 22.7 | 40:60 | 3.40 | 87 |
| 2-3 | 4.4 | 15.0 | 27.1 | 10:90 | 3.64 | 83 |
| 2-4 | 2.5 | 11.4 | 21.5 | 45:55 | 3.35 | 86 |

As can be appreciated from Table 4, in a case where the conditions: the particle size D10 within a range from 2.8 μm to 4.0 μm both inclusive; the particle size D50 within a range from 11.8 μm to 14.4 μm both inclusive; and the particle size D90 within a range from 22.7 μm to 26.3 μm both inclusive, were satisfied (Experiment examples 1-1, 2-1, and 2-2), a high capacity retention rate was obtained, as compared with a case where these conditions were not satisfied (Experiment examples 2-3 and 2-4).

In particular, in the case where the above-described conditions related to the particle sizes D10, D50, and D90 were satisfied, if the compressed density was within a range from 3.40 g/cm$^3$ to 3.60 g/cm$^3$ both inclusive, a high capacity retention rate was obtained.

Experiment Examples 3-1 to 3-8

As given in Table 5, secondary batteries were fabricated and a battery characteristic (a cyclability characteristic) of each of the fabricated secondary batteries was evaluated by a similar procedure, except that the particle size (μm) of the peak P1 and the particle size (μm) of the peak P2 in the volume-based particle size distribution were changed. In this case, as given in Table 5, the positive electrode active material 100 having two peaks P (P1 and P2) was obtained by mixing the small-sized particles and the large-sized particles at a predetermined mixture ratio (weight ratio). The particle size D50 (μm) of each of the small-sized particles and the large-sized particles was as given in Table 5. In accordance therewith, the compressed density (g/cm$^3$) of the positive electrode active material 100 was also changed.

Table 5

Positive electrode active material: Center part $(LiNi_{0.82}Co_{0.14}Al_{0.04}O_2)$+Covering part $(H_3BO_3)$ Crystallite size Z=52.0 nm, Specific surface area A=1.07 m$^2$/g, Element concentration ratio R1=0.11, Element concentration ratio R2=1.00, Element concentration ratio R3=0.40

| Experiment example | Particle diameter (μm) P1 | Particle diameter (μm) P2 | Particle size D50 (μm) Small-sized particle | Particle size D50 (μm) Large-sized particle | Mixture ratio (Weight ratio) Small-sized particle: Large-sized particle | Compressed density (g/cm³) | Capacity retention rate (%) |
|---|---|---|---|---|---|---|---|
| 1-1 | 4.4 | 19.1 | 4.0 | 18.0 | 30:70 | 3.60 | 90 |
| 3-1 | 3.0 | 19.1 | 3.0 | 18.0 | 30:70 | 3.70 | 90 |
| 3-2 | 7.0 | 19.1 | 7.0 | 18.0 | 30:70 | 3.50 | 90 |
| 3-3 | 4.4 | 14.0 | 4.0 | 14.0 | 30:70 | 3.64 | 90 |
| 3-4 | 4.4 | 30.0 | 4.0 | 30.0 | 30:70 | 3.45 | 90 |
| 3-5 | 2.5 | 19.1 | 2.5 | 18.0 | 30:70 | 3.62 | 83 |
| 3-6 | 7.5 | 19.1 | 7.5 | 18.0 | 30:70 | 3.37 | 90 |
| 3-7 | 4.4 | 13.0 | 4.0 | 13.0 | 30:70 | 3.30 | 90 |
| 3-8 | 4.4 | 31.0 | 4.0 | 31.0 | 30:70 | 3.63 | 81 |

As given in Table 5, in a case where the conditions: the particle size of the peak P1 within a range from 3.0 μm to 7.0 μm both inclusive; and the particle size of the peak P2 within a range from 14.0 μm to 30.0 μm both inclusive, were satisfied (Experiment examples 1-1 and 3-1 to 3-4), a high capacity retention rate was obtained, as compared with a case where the above-described conditions were not satisfied (Experiment Examples 3-5 to 3-8).

In particular, in the case where the above-described conditions related to the respective particle sizes of the peaks P1 and P2 were satisfied, if the compressed density was within a range from 3.45 g/cm³ to 3.70 g/cm³, a high capacity retention rate was obtained.

CONCLUSION

As described above, in a case where the positive electrode active material 100 including the center part 110 (the lithium-nickel composite oxide) and the covering part 120 (the boron compound) was used, if all of the five conditions related to the configuration and the physical properties of the positive electrode active material 100 were satisfied, such a positive electrode active material 100 had a superior gas generation characteristic. Accordingly, the secondary battery 10 using the positive electrode active material 100 had a favorable initial capacity characteristic, a favorable cyclability characteristic, and a favorable swelling characteristic (gas generation characteristic), and therefore achieved superior battery characteristics.

Although the present technology has been described above with reference to some embodiments and Examples, the embodiment of the present technology is not limited to those described with reference to the embodiments and the Examples above, and is therefore modifiable in a variety of ways.

For example, although the description has been given with reference to the case where the secondary battery of the technology is of the laminated-film type, the secondary battery of the technology is not limited to a particular type. For example, the secondary battery of the present technology may be of any other suitable type, for example, a cylindrical type, a prismatic type, or a coin type.

The effects described herein are mere examples. Therefore, the effects of the present technology are not limited to the effects described herein. Accordingly, the technology may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active material for a secondary battery, the positive electrode active material comprising:
   a center part including a layered rock-salt lithium-nickel composite oxide represented by Formula (1) below; and
   a covering part covering a surface of the center part and including a boron compound, wherein
   the positive electrode active material has a crystallite size of a (104) plane that is greater than or equal to 40.0 nanometers and less than or equal to 74.5 nanometers, the crystallite size being calculated by X-ray diffractometry and Scherrer equation,
   the positive electrode active material has a specific surface area that satisfies a condition represented by Expression (2) below, the specific surface area being measured by Brunauer-Emmett-Teller specific surface area measurement method,
   the positive electrode active material has a first element concentration ratio that is greater than or equal to 0.08 and less than or equal to 0.80, the first element concentration ratio being calculated on a basis of a C1s spectrum and an O1s spectrum measured by X-ray photoelectron spectroscopy and being represented by Expression (3) below,
   the positive electrode active material has a second element concentration ratio that is greater than or equal to 0.60 and less than or equal to 1.50, the second element concentration ratio being calculated on a basis of a Li1s spectrum, a Ni2p$_{3/2}$ spectrum, a Co2p$_{3/2}$ spectrum, a Mn2p$_{1/2}$ spectrum, and an Al2s spectrum measured by the X-ray photoelectron spectroscopy and being represented by Expression (4) below, and
   the positive electrode active material has a third element concentration ratio that is greater than or equal to 0.15 and less than or equal to 0.90, the third element concentration ratio being calculated on a basis of a B1s spectrum, a Ni2p$_{3/2}$ spectrum, a Co2p$_{3/2}$ spectrum, a Mn2p$_{1/2}$ spectrum, and an Al2s spectrum measured by the X-ray photoelectron spectroscopy and being represented by Expression (5) below, $$Li_aNi_{1-b}M_bO_c \qquad (1)$$

where
M is at least one of cobalt (Co), iron (Fe), manganese (Mn), copper (Cu), zinc (Zn), aluminum (Al), chromium (Cr), vanadium (V), titanium (Ti), magnesium (Mg), or zirconium (Zr), and
a, b, and c satisfy $0.8<a<1.2$, $0\leq b\leq 0.4$, and $0<c<3$, $$-0.0160\times Z+1.72 \leq A \leq -0.0324\times Z+2.94 \quad (2)$$

where
Z is the crystallite size of the (104) plane in nanometers, and
A is the specific surface area in square meters per gram, $$R1=I1/I2 \quad (3)$$

where
R1 is the first element concentration ratio,
I1 is a $CO_3$ concentration in atomic percent calculated on the basis of the C1s spectrum,
I2 is a Me—O concentration in atomic percent calculated on the basis of the O1s spectrum, and
Me—O is an oxide deriving from O that is bonded to Li, Ni, or M in Formula (1) and has a spectrum detected within a range of binding energy that is higher than or equal to 528 electron volts and lower than or equal to 531 electron volts, $$R2=I3/I4 \quad (4)$$

where
R2 is the second element concentration ratio,
I3 is a Li concentration in atomic percent calculated on the basis of the Li1s spectrum, and
I4 is sum total of a Ni concentration in atomic percent, a Co concentration in atomic percent, a Mn concentration in atomic percent, and an Al concentration in atomic percent that are calculated on the basis of the $Ni2p_{3/2}$ spectrum, the $Co2p_{3/2}$ spectrum, the $Mn2p_{1/2}$ spectrum, and the Al2s spectrum, respectively, $$R3=I5/I4 \quad (5)$$

where
R3 is the third element concentration ratio,
I4 is sum total of a Ni concentration in atomic percent, a Co concentration in atomic percent, a Mn concentration in atomic percent, and an Al concentration in atomic percent that are calculated on the basis of the $Ni2p_{3/2}$ spectrum, the $Co2p_{3/2}$ spectrum, the $Mn2p_{1/2}$ spectrum, and the Al2s spectrum, respectively, and
I5 is a B concentration in atomic percent calculated on the basis of the B1s spectrum.

2. The positive electrode active material for a secondary battery according to claim 1, wherein the specific surface area is greater than or equal to 0.53 square meters per gram and less than or equal to 1.25 square meters per gram.

3. The positive electrode active material for a secondary battery according to claim 1, wherein the positive electrode active material has a particle size D50 in a volume-based particle size distribution that is greater than or equal to 11.8 micrometers and less than or equal to 14.4 micrometers.

4. The positive electrode active material for a secondary battery according to claim 2, wherein the positive electrode active material has a particle size D50 in a volume-based particle size distribution that is greater than or equal to 11.8 micrometers and less than or equal to 14.4 micrometers.

5. The positive electrode active material for a secondary battery according to claim 3, wherein
the positive electrode active material has a particle size D10 in the volume-based particle size distribution that is greater than or equal to 2.8 micrometers and less than or equal to 4.0 micrometers, and
the positive electrode active material has a particle size D90 in the volume-based particle size distribution that is greater than or equal to 22.7 micrometers and less than or equal to 26.3 micrometers.

6. The positive electrode active material for a secondary battery according to claim 3, wherein the positive electrode active material has a compressed density that is higher than or equal to 3.40 grams per cubic centimeter and lower than or equal to 3.60 grams per cubic centimeter.

7. The positive electrode active material for a secondary battery according to claim 5, wherein the positive electrode active material has a compressed density that is higher than or equal to 3.40 grams per cubic centimeter and lower than or equal to 3.60 grams per cubic centimeter.

8. The positive electrode active material for a secondary battery according to claim 1, wherein the positive electrode active material has a volume-based particle size distribution having two or more peaks.

9. The positive electrode active material for a secondary battery according to claim 2, wherein the positive electrode active material has a volume-based particle size distribution having two or more peaks.

10. The positive electrode active material for a secondary battery according to claim 3, wherein the positive electrode active material has a volume-based particle size distribution having two or more peaks.

11. The positive electrode active material for a secondary battery according to claim 5, wherein the positive electrode active material has a volume-based particle size distribution having two or more peaks.

12. The positive electrode active material for a secondary battery according to claim 6, wherein the positive electrode active material has a volume-based particle size distribution having two or more peaks.

13. The positive electrode active material for a secondary battery according to claim 8, wherein the volume-based particle size distribution has a first peak within a range of a particle size that is greater than or equal to 3 micrometers and less than or equal to 7 micrometers, and has a second peak within a range of the particle size that is greater than or equal to 14 micrometers and less than or equal to 30 micrometers.

14. The positive electrode active material for a secondary battery according to claim 8, wherein the positive electrode active material has a compressed density that is higher than or equal to 3.45 grams per cubic centimeter and lower than or equal to 3.70 grams per cubic centimeter.

15. The positive electrode active material for a secondary battery according to claim 13, wherein the positive electrode active material has a compressed density that is higher than or equal to 3.45 grams per cubic centimeter and lower than or equal to 3.70 grams per cubic centimeter.

16. A secondary battery comprising:
a positive electrode including a positive electrode active material;
a negative electrode; and
an electrolytic solution,
the positive electrode active material including
a center part including a layered rock-salt lithium-nickel composite oxide represented by Formula (1) below, and
a covering part covering a surface of the center part and including a boron compound, wherein
the positive electrode active material has a crystallite size of a (104) plane that is greater than or equal to 40.0 nanometers and less than or equal to 74.5 nanometers, the crystallite size being calculated by X-ray diffractometry and Scherrer equation, the positive electrode active material has a specific surface area that satisfies a condition represented by Expression (2) below, the specific surface area being measured by Brunauer-Emmett-Teller specific surface area measurement method, the positive electrode active material has a first element concentration ratio that is greater than or equal to 0.08 and less than or equal to 0.80, the first element concentration ratio being calculated on a basis of a C1s spectrum and an O1s spectrum measured by X-ray photoelectron spectroscopy and being represented by Expression (3) below, the positive electrode active material has a second element concentration ratio that is greater than or equal to 0.60 and less than or equal to 1.50, the second element concentration ratio being calculated on a basis of a Li1s spectrum, a Ni2p$_{3/2}$ spectrum, a Co2p$_{3/2}$ spectrum, a Mn2p$_{1/2}$ spectrum, and an Al2s spectrum measured by the X-ray photoelectron spectroscopy and being represented by Expression (4) below, and the positive electrode active material has a third element concentration ratio that is greater than or equal to 0.15 and less than or equal to 0.90, the third element concentration ratio being calculated on a basis of a B1s spectrum, a Ni2p$_{3/2}$ spectrum, a Co2p$_{3/2}$ spectrum, a Mn2p$_{1/2}$ spectrum, and an Al2s spectrum measured by the X-ray photoelectron spectroscopy and being represented by Expression (5) below, $$Li_aNi_{1-b}M_bO_c \quad (1)$$

where

M is at least one of cobalt (Co), iron (Fe), manganese (Mn), copper (Cu), zinc (Zn), aluminum (Al), chromium (Cr), vanadium (V), titanium (Ti), magnesium (Mg), or zirconium (Zr), and a, b, and c satisfy $0.8<a<1.2$, $0\le b\le 0.4$, and $0<c<3$, $$-0.0160\times Z+1.72\le A\le -0.0324\times Z+2.94 \quad (2)$$

where

Z is the crystallite size of the (104) plane of the positive electrode active material in nanometers, and A is the specific surface area of the positive electrode active material in square meters per gram, $$R1=I1/I2 \quad (3)$$

where

R1 is the first element concentration ratio,

I1 is a $CO_3$ concentration in atomic percent calculated on the basis of the C1s spectrum, I2 is a Me—O concentration in atomic percent calculated on the basis of the O1s spectrum, and Me—O is an oxide deriving from O that is bonded to Li, Ni, or M in Formula (1) and has a spectrum detected within a range of binding energy that is higher than or equal to 528 electron volts and lower than or equal to 531 electron volts, $$R2=I3/I4 \quad (4)$$

where

R2 is the second element concentration ratio,

I3 is a Li concentration in atomic percent calculated on the basis of the Li1s spectrum, and I4 is sum total of a Ni concentration in atomic percent, a Co concentration in atomic percent, a Mn concentration in atomic percent, and an Al concentration in atomic percent that are calculated on the basis of the Ni2p$_{3/2}$ spectrum, the Co2p$_{3/2}$ spectrum, the Mn2p$_{1/2}$ spectrum, and the Al2s spectrum, respectively, $$R3=I5/I4 \quad (5)$$

where

R3 is the third element concentration ratio,

I4 is sum total of a Ni concentration in atomic percent, a Co concentration in atomic percent, a Mn concentration in atomic percent, and an Al concentration in atomic percent that are calculated on the basis of the Ni2p$_{3/2}$ spectrum, the Co2p$_{3/2}$ spectrum, the Mn2p$_{1/2}$ spectrum, and the Al2s spectrum, respectively, and I5 is a B concentration in atomic percent calculated on the basis of the B1s spectrum.

17. The secondary battery according to claim 16, further comprising an outer package member that has a film shape and contains the positive electrode, the negative electrode, and the electrolytic solution.

* * * * *